United States Patent
Durbin et al.

(10) Patent No.: US 9,656,755 B2
(45) Date of Patent: May 23, 2017

(54) AIR CYCLE MACHINE PACK SYSTEM AND METHOD FOR IMPROVING LOW INLET PRESSURE COOLING PERFORMANCE

(71) Applicant: The Boeing Company, Chicago, IL (US)

(72) Inventors: Richard R. Durbin, Mukilteo, WA (US); Charles J. Fiterman, Mukilteo, WA (US); Daniel J. Sullivan, Mill Creek, WA (US)

(73) Assignee: The Boeing Company, Chicago, IL (US)

(*) Notice: Subject to any disclaimer, the term of this patent is extended or adjusted under 35 U.S.C. 154(b) by 773 days.

(21) Appl. No.: 14/105,184

(22) Filed: Dec. 13, 2013

(65) Prior Publication Data

US 2015/0166187 A1  Jun. 18, 2015

(51) Int. Cl.
*B64C 1/20* (2006.01)
*B64D 13/08* (2006.01)
*B64D 13/06* (2006.01)

(52) U.S. Cl.
CPC ...... *B64D 13/08* (2013.01); *B64D 2013/0618* (2013.01); *Y02T 50/56* (2013.01)

(58) Field of Classification Search
USPC ....... 244/118.5, 117 R, 129.1, 53 R; 62/404, 62/419, 426, 467
See application file for complete search history.

(56) References Cited

U.S. PATENT DOCUMENTS

| 4,261,416 A | 4/1981 | Hamamoto |
| 6,526,775 B1 | 3/2003 | Asfia et al. |
| 7,121,100 B2 | 10/2006 | Atkey et al. |
| 7,207,521 B2 | 4/2007 | Atkey et al. |
| 7,624,944 B2 | 12/2009 | Parikh et al. |
| 7,871,038 B2 | 1/2011 | Space et al. |
| 8,336,821 B2 | 12/2012 | Shell et al. |
| 2005/0061911 A1 | 3/2005 | Zywiak |
| 2006/0059942 A1 | 3/2006 | McAuliffe et al. |

(Continued)

FOREIGN PATENT DOCUMENTS

| DE | 69706408 T2 | 6/2002 |
| EP | 1386837 A1 | 2/2004 |

OTHER PUBLICATIONS

European Patent Office Extended European Search Report for Counterpart Patent Application No. EP14197557.3-1754, Applicant The Boeing Company, dated May 15, 2015, 9 pages.

(Continued)

*Primary Examiner* — J. Woodrow Eldred

(57) ABSTRACT

An air cycle machine (ACM) pack system for an aircraft with an improved low inlet pressure cooling performance is provided. The ACM pack system has an air cycle machine (ACM) with at least one compressor mechanically coupled to at least one turbine in series on an ACM shaft. The ACM pack system further has a pack heat exchanger coupled to and in fluid communication with the at least one compressor of the ACM. The ACM system further has a bypass air flow assembly coupled in a parallel operation path to the ACM and has a bypass air flow regulating element. The bypass air flow assembly transfers energy extracted by the bypass air flow assembly to the ACM to aid the ACM pack system in cooling performance at a low inlet pressure, resulting in an improved low inlet pressure cooling performance of the ACM pack system.

23 Claims, 9 Drawing Sheets

(56) References Cited

U.S. PATENT DOCUMENTS

2011/0107777 A1    5/2011   Atkey et al.
2013/0187007 A1    7/2013   Mackin et al.

OTHER PUBLICATIONS

European Patent Office (EPO) Examination Report, Issued Feb. 21, 2017, for counterpart European Patent Application No. 14197557.3, Applicant The Boeing Company, 4 pages.

AIR CYCLE MACHINE PACK SYSTEM AND METHOD FOR IMPROVING LOW INLET PRESSURE COOLING PERFORMANCE

BACKGROUND

1) Field of the Disclosure

The disclosure relates generally to aircraft air conditioning systems and methods, and more particularly, to systems and methods for improving low inlet pressure cooling performance of an air cycle machine (ACM) pack system in a bleed air based aircraft air conditioning system.

2) Description of Related Art

A typical aircraft air cycle machine package (ACM pack) for an aircraft air conditioning system may include one or more heat exchangers, a compressor and one or more turbines. These components are sized for various cooling and air flow criteria both on the ground and in flight. The power to operate the ACM pack may be obtained from the difference of inlet to outlet pressures with the outlet pressure being defined by the required aircraft cabin pressure. Thus, as the available inlet pressure is reduced, the ACM pack's performance potential is also reduced.

When operating at higher altitudes, the available inlet pressure decreases due to the reduced outside ambient air pressure passing through the relatively fixed pressure ratio of the aircraft's engine bleed air system. As this inlet pressure is reduced to the limits of the pack's cooling and air flow performance, air flow may be reduced to maintain the desired cold output temperature or the output temperature may be raised to maintain the desired air flow by bypassing some flow around the turbine(s). However, as power through the ACM pack is reduced, the compressor and turbine(s) move off their optimal design points and may become less efficient, further aggravating the power loss due to the reduced inlet pressure. This may result in an even greater reduction in the ACM pack's performance with the reduction of inlet pressure.

Recent FAR (Federal Aviation Regulation) requirements regarding minimum air flow per occupant in a passenger cabin of an aircraft, have complicated the issue between cooling performance and air flow when inlet pressures are reduced, in that if air flow is to be reduced, it must be reduced to non-occupant usages such as cargo. Thus, ACM packs need to be designed not only to meet pull down performance but also to meet cooling and air flow requirements at the lower inlet pressures seen at altitude. This may require trading the increased size and weight of a more capable pack versus placing limits on the ACM pack requirements due to heat loads, occupant counts, and or cargo.

Accordingly, what is needed is an improved aircraft system and method for improving low inlet pressure cooling performance of an air cycle machine (ACM) pack system in a bleed air based aircraft air conditioning system, while still maintaining the necessary air flow.

SUMMARY

This need for an improved aircraft system and method is satisfied. As discussed in the below detailed description, embodiments of such improved aircraft system and method may provide significant advantages over existing systems and methods.

In one embodiment there is provided an air cycle machine (ACM) pack system for an aircraft. The ACM pack system has an improved low inlet pressure cooling performance. The ACM pack system comprises an air cycle machine (ACM) comprising at least one compressor mechanically coupled to at least one turbine in series on an ACM shaft. The ACM pack system further comprises a pack heat exchanger coupled to and in fluid communication with the at least one compressor of the ACM.

The ACM system further comprises a bypass air flow assembly coupled in a parallel operation path to the ACM. The bypass air flow assembly has a bypass air flow regulating element. The bypass air flow assembly transfers energy extracted by the bypass air flow assembly to the ACM to aid the ACM pack system in cooling performance at a low inlet pressure, resulting in an improved low inlet pressure cooling performance of the ACM pack system.

In another embodiment there is provided an aircraft comprising one or more aircraft engines, each aircraft engine having a bleed air system for generating bleed air. The aircraft further comprises a fuselage defining an interior volume having an aircraft cabin and a pack bay separate from the aircraft cabin.

The aircraft further comprises an aircraft air conditioning system positioned in the pack bay and in fluid communication with the aircraft cabin. The aircraft air conditioning system comprises an air cycle machine (ACM) pack system.

The ACM pack system comprises an air cycle machine (ACM) comprising at least one compressor mechanically coupled to at least one turbine in series on an ACM shaft. The ACM pack system further comprises a pack heat exchanger coupled to and in fluid communication with the at least one compressor of the ACM. The ACM pack system further comprises a bypass air flow assembly coupled in a parallel operation path to the ACM. The bypass air flow assembly has a parallel turbine valve. The bypass air flow assembly transfers energy extracted by the bypass air flow assembly to the ACM to aid the ACM pack system in cooling performance at a low inlet pressure, resulting in an improved low inlet pressure cooling performance of the ACM pack system.

In another embodiment there is provided a method for improving low inlet pressure cooling performance of an air cycle machine (ACM) pack system. The method comprises the step of installing an air cycle machine (ACM) pack system in an aircraft air conditioning system of an aircraft. The ACM pack system comprises an air cycle machine (ACM) comprising at least one compressor mechanically coupled to at least one turbine in series on an ACM shaft. The ACM pack system further comprises a pack heat exchanger coupled to and in fluid communication with the at least one compressor of the ACM. The ACM pack system further comprises a bypass air flow assembly configured for coupling to the ACM and having a bypass air flow regulating element.

The method further comprises the step of coupling the bypass air flow assembly and the ACM in a parallel operation path. The method further comprises the step of using the bypass air flow assembly to extract energy from a bypass air flow flowing across the bypass air flow assembly to obtain extracted energy. The method further comprises the step of transferring the extracted energy from the bypass air flow assembly to the ACM to aid the air cycle machine (ACM) pack system in cooling performance at a low inlet pressure, resulting in an improved low inlet pressure cooling performance of the air cycle machine (ACM) pack system.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
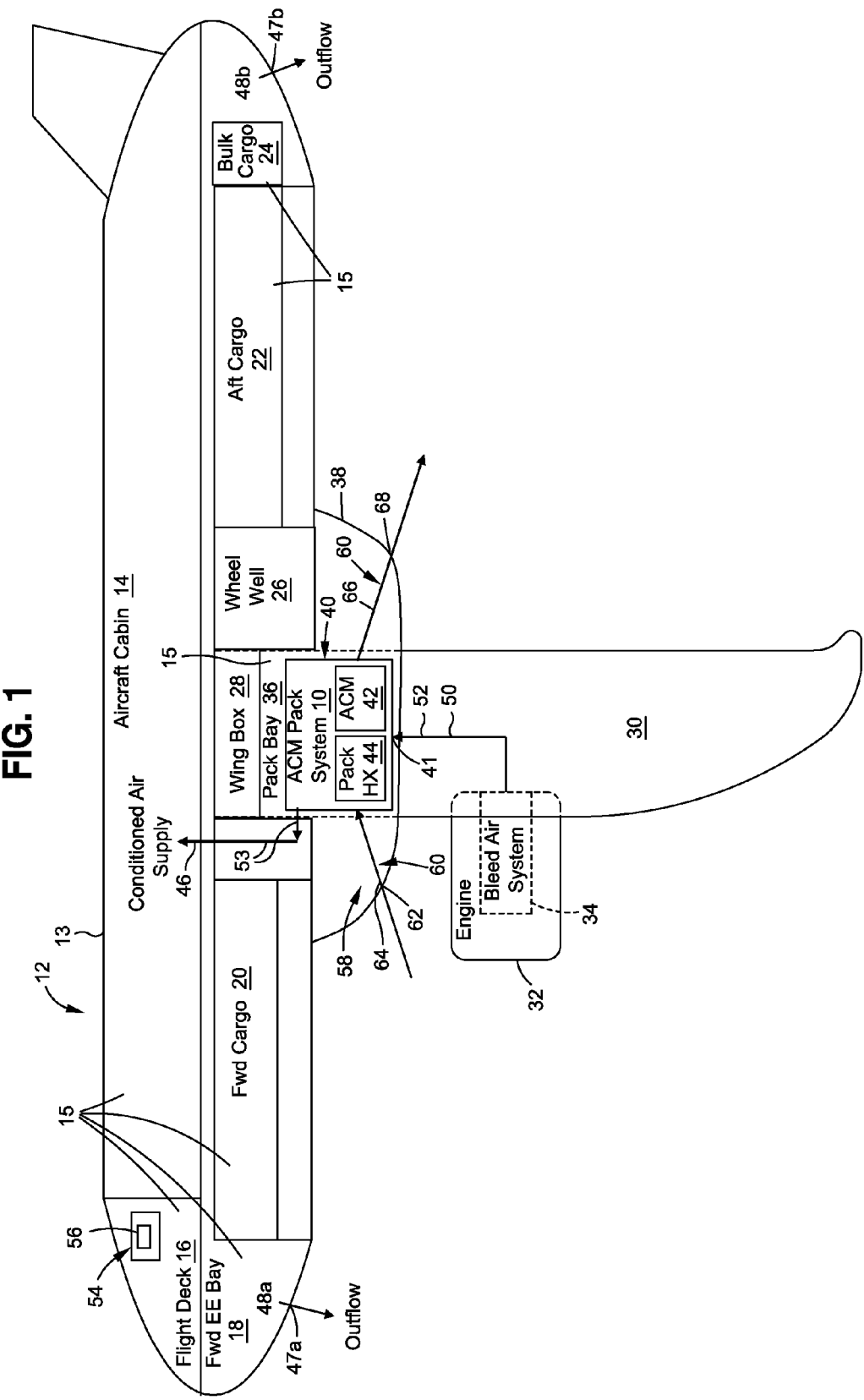
FIG. 1 is an illustration of a schematic diagram of an aircraft that may incorporate one of the embodiments of an air cycle machine (ACM) pack system of the disclosure in an aircraft air conditioning system of the aircraft.

Now referring to the Figures, FIG. 1 is an illustration of a schematic diagram of an aircraft 12 that may incorporate one of the embodiments of an air cycle machine package (ACM pack) system 10 of the disclosure in an aircraft air conditioning system 40 of the aircraft 12. The ACM pack system 10 (see FIGS. 2-6), discussed in detail below, is designed to improve low inlet pressure cooling performance. Further, a method 250 (see FIG. 8) for improving low inlet pressure cooling performance of an air cycle machine (ACM) pack system 10 (see FIGS. 2-6) is disclosed.

As shown in FIG. 1, the aircraft 12 has a fuselage 13 defining an interior volume 15. The interior volume 15 may include an aircraft cabin 14 preferably for passengers or cargo, a flight deck 16 preferably for pilots or other flight crew members, a forward electronics and equipment bay 18, a forward cargo compartment 20, an aft cargo compartment 22, and a bulk cargo compartment 24. The interior volume 15 of the aircraft 12 may further include additional cargo compartments or areas. The aircraft cabin 14 and flight deck 16 are pressurized areas with pressurized air, and the forward electronics and equipment bay 18, the forward cargo compartment 20, the aft cargo compartment 22, and the bulk cargo compartment 24 may optionally be pressurized areas with pressurized air.

The aircraft 12 further comprises a wing box 28 (see FIG. 1) from which one or more wings 30 (see FIG. 1) extend. FIG. 1 shows one wing 30 extending from the wing box 28 and another wing 30 (not shown) preferably extends outwardly from the opposite side of the wing box 28. As shown in FIG. 1, the wing 30 has one or more engines 32, such as in the form of gas turbine engines. Each engine 32 may have one or more bleed air systems 34 (see FIG. 1) coupled within the engine 32.

As shown in FIG. 1, the interior volume 15 of the aircraft 12 further includes at least one pack bay 36. Preferably, the aircraft 12 has two pack bays 36 with one pack bay 36 positioned beneath each wing 30. However, the aircraft 12 may have additional pack bays 36 and the pack bays 36 may be located in another suitable area of the aircraft 12. The pack bay 36 is an unpressurized area with unpressurized air. The interior of the pack bay 36 may extend into the interior of an aircraft fairing 38 (see FIG. 1), such as a wing-to-body aircraft fairing, which is a structure on the aircraft 12 positioned below the fuselage 13 and between the wings 30.

The pack bay 36 and the aircraft fairing 38 house the aircraft air conditioning system 40 (see FIG. 1). As shown in FIG. 1, the aircraft air conditioning system 40 comprises an embodiment of the air cycle machine (ACM) pack system 10 having an inlet 41, an air cycle machine (ACM) 42, and a pack heat exchanger (HX) 44.

As further shown in FIG. 1, bleed air 50 from the bleed air system 34 (i.e., pneumatic system) of the aircraft engine 32 may be transported via bleed air ducts 52 to the aircraft air conditioning system 40, and in particular, to the ACM pack system 10 of the aircraft air conditioning system 40. For purposes of this application, "bleed air" means outside air drawn into an aircraft engine, such as an aircraft gas turbine engine, that is compressed at a compressor stage of the aircraft engine and that is used as a source of energy or power to an aircraft air conditioning system and an air cycle machine (ACM) pack of an aircraft air conditioning system and that may also be used in other systems or components in the aircraft. The ACM pack system 10 and the aircraft air conditioning system 40, as shown in FIGS. 2-6, may be referred to as bleed air based systems.

Once the bleed air 50 (see FIG. 1) is conditioned in the aircraft air conditioning system 40, it may then be distributed as a conditioned air supply 46 (see FIG. 1) via air ducts 53 (see FIG. 1) into the aircraft cabin 14 (see FIG. 1) and other interior volumes 15 (see FIG. 1) of the aircraft 12 (see FIG. 1) for aircraft interior temperature and humidity control, ventilation, and pressurization. The conditioned air supply 46 (see FIG. 1) may be discharged to the outside ambient environment or recirculated back to the aircraft air conditioning system 40 (see FIG. 1). As shown in FIG. 1, the aircraft 12 further comprises one or more outflow air valves 47a, 47b for allowing outflow air 48a, 48b to flow out of the aircraft 12. The outflow air 48a, 48b (see FIG. 1) may comprise cabin outflow air and/or other outflow air from other areas of the aircraft 12 (see FIG. 1).

As further shown in FIG. 1, ram air 60 may be drawn into the ACM pack system 10 of the aircraft air conditioning system 40 from outside of the aircraft 12 via a ram air system 58. The ram air 60 (see FIG. 1) is used to cool the bleed air 50 (see FIG. 1) drawn into the ACM pack system 10 (see FIG. 1), and in turn, this may cool the conditioned air supply 46 (see FIG. 1) to the aircraft cabin 14 (see FIG. 1). For purposes of this application, "ram air" means ambient air outside of an aircraft, created by movement of the aircraft itself, that is taken into an aircraft via a ram air inlet and used to cool bleed air drawn into an air cycle machine (ACM) pack system, and in turn, may be used to cool a conditioned air supply to an aircraft cabin. The ram air 60 (see FIG. 1) may act as a heat sink to the pack heat exchanger (HX) 44 (see FIG. 1) for the ram air system 58 (see FIG. 1).

The ram air system 58, as shown in FIG. 1, comprises a ram air inlet 62 and a ram air inlet duct 64 for drawing or pulling in ram air 60, such as in the form of ram inlet air 60a (see FIG. 2), into the ACM pack system 10, and in particular, into and through the pack heat exchanger (HX) 44. The ram air system 58, as shown in FIG. 1, further comprises a ram air outlet duct 66 and ram air outlet 68 for discharging ram air 60, such as in the form of ram outlet air 60b (see FIG. 2), out of the ACM pack system 10, and in particular, out of the pack heat exchanger (HX) 44.

As further shown in FIG. 1, the aircraft 12 further comprises one or more control systems 54 (see FIGS. 1, 7) operably coupled or connected to the ACM pack system 10 to control and operate the ACM pack system 10, as necessary. The one or more control systems 54 (see FIG. 1) may be located in the flight deck 16 (see FIG. 1) or in another suitable location in the aircraft 12 (see FIG. 1). The one or more control systems 54 (see FIG. 1) may be used, for example, to enable and disable valves, switches, fans, and other various components, in order to control and regulate, for example, the amount of air flow, the temperature and pressure of the air flow, humidity, ventiliation, and other applicable features. For example, the one or more control systems 54 (see FIG. 1) may comprise one or more of an environmental control system with an integrated air supply control system and a cabin air conditioning and temperature control system, a mechanical control system, a pneumatic control system, a hydraulic control system, an electrical control system, or another suitable control system.

Figure 7:
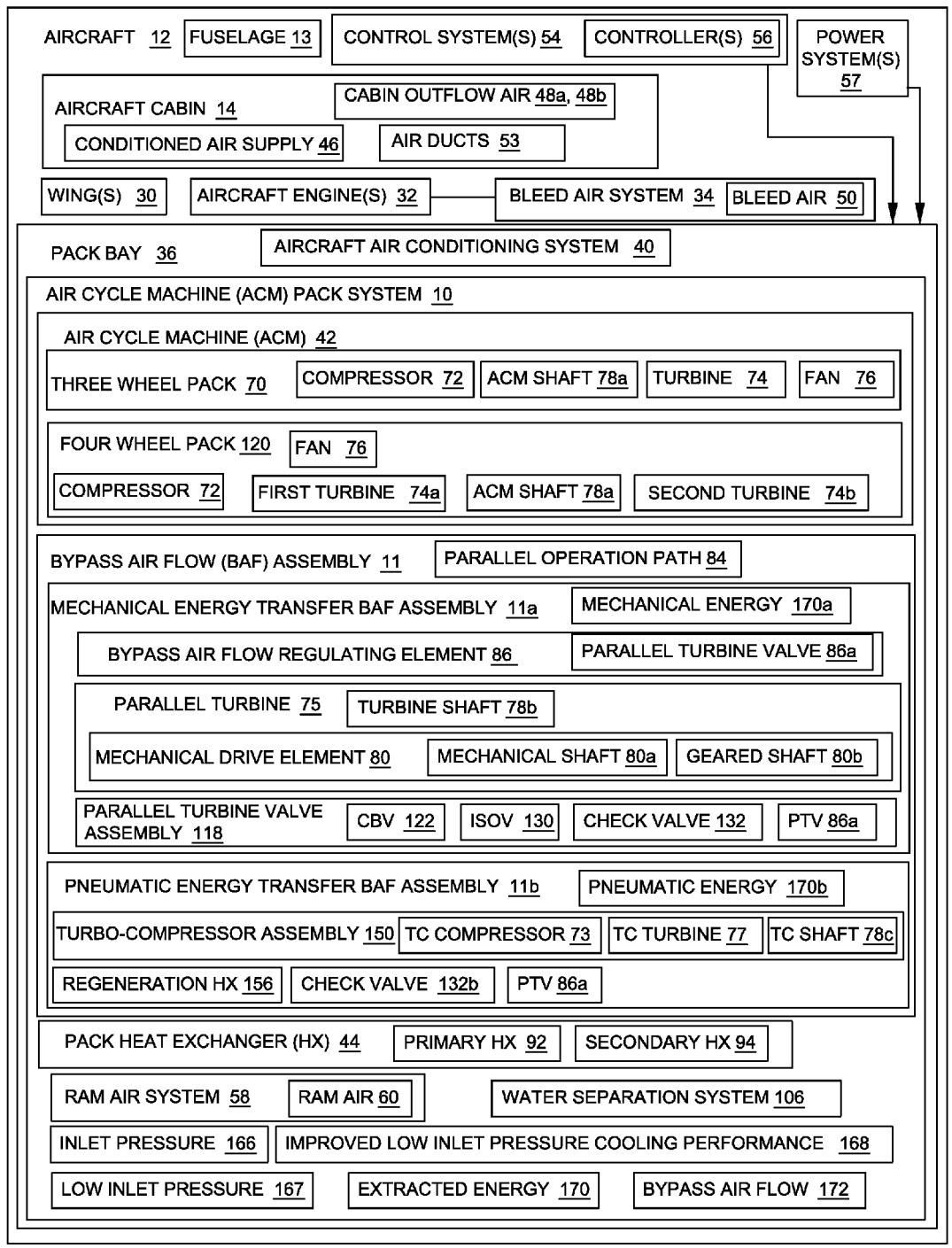
FIG. 7 is an illustration of a functional block diagram of an embodiment of an aircraft showing an aircraft air conditioning system that may include an embodiment of an air cycle machine (ACM) pack system of the disclosure.

The control system 54 preferably comprises one or more controllers 56 (see FIGS. 1, 7). The controller 56 (see FIG. 1) may also be located in the flight deck 16 (see FIG. 1) or in another suitable location in the aircraft 12 (see FIG. 1). The control system 54 (see FIG. 1) and controller 56 (see FIG. 1) may be coupled to or connected to the ACM pack system 10 (see FIG. 1) via one or more wired control lines (not shown) or via wireless couplings or connections (not shown). The controller 56 (see FIG. 1) may comprise one or more of a computer processing device with associated software, an integrated air system controller with associated software, a digital electronic controller with digital computer and associated software, an analog electronic controller with analog computer and associated software, a pneumatic controller with relay logic circuits and programmable logic controllers or computers, a pneumatic controller with air logic controls and programmable logic controllers or computers, a hydraulic controller with hardwired relay logic and programmable logic controllers or computers, or another suitable controller.

The aircraft 12 (see FIG. 1) further comprises one or more power systems 57 (see FIG. 7) that may provide power to one or more components of the ACM pack system 10 (see FIG. 1). The one or more power systems 57 that drive one or more components of the ACM pack system 10 (see FIG. 1) may comprise one or more of mechanical or shaft power, pneumatic power, electric power, hydraulic power, or another suitable power system.

In one embodiment there is provided an air cycle machine (ACM) pack system 10 (see FIGS. 2-6) for an aircraft 12 (see FIGS. 2-6). The ACM pack system 10 (see FIGS. 2-7) has an improved low inlet pressure cooling performance 168 (see FIG. 7). FIGS. 2-6 show various embodiments of the inventive ACM pack system 10 that is preferably installed in the aircraft air conditioning (AC) system 40 in the pack bay 36 (see FIG. 1) of the aircraft 12 (see FIGS. 1-6). The ACM pack system 10 (see FIGS. 2-6) is preferably designed for use in a bleed air based air conditioning system. In particular, the ACM pack system 10 (see FIGS. 2-6) is useful when an inlet pressure 166 (see FIG. 7) of the bleed air 50 (see FIG. 7) is low, such as during a cruise mode by the aircraft 12 (see FIG. 1).

The ACM pack system 10 (see FIGS. 2-6) may be installed in a new aircraft that uses a bleed air based air conditioning system or may be retrofitted into an existing aircraft that uses a bleed air based air conditioning system. The specific application of one embodiment of the ACM pack system 10 (see FIGS. 2-6) over another may depend on the architecture and size of the aircraft, whether the aircraft is a new design or an existing design, or design considerations of the aircraft.

FIGS. 2-6 show embodiments of the ACM pack system 10 with the air cycle machine (ACM) 42 and the pack heat exchanger (HX) 44. The ACM pack system 10 see FIGS. 2-6) comprises an air cycle machine (ACM) 42 (see FIGS. 2-6) comprising at least one compressor 72 (see FIGS. 2-6) mechanically coupled to at least one turbine 74 (see FIGS. 2-6) in series on an ACM shaft 78a (see FIGS. 2-6).

As used herein, the term "air cycle machine (ACM) pack" means a device or system that conditions pressurized air intended to be supplied to an aircraft, where the pressurized air is conditioned for temperature via a cooling cycle system, and where the pressurized air is conditioned for humidity via a humidity control system. The ACM pack system 10 may comprise further components such as valves, ducts, controllers, and other components known in the art. The ACM pack system 10 (see FIGS. 2-6) used in embodiments of the aircraft air conditioning system 40 (see FIG. 1) disclosed herein provides pressurization, ventilation and temperature and humidity control to the aircraft 12 (see FIG. 1) throughout the aircraft's entire operation, including at sea level and at cruise level.

Figure 2:
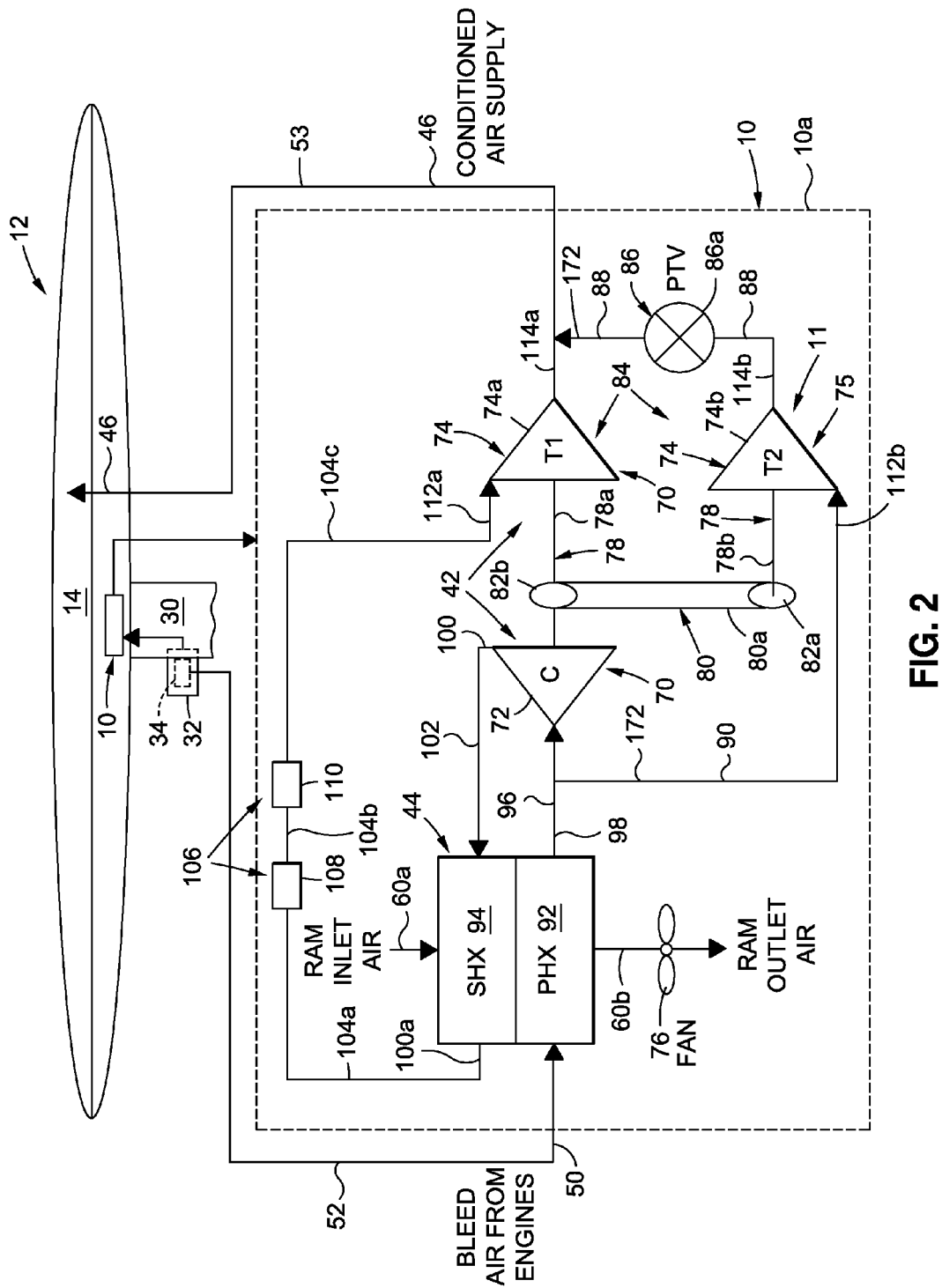
FIG. 2 is an illustration of a schematic diagram of an embodiment of an air cycle machine (ACM) pack system of the disclosure with a parallel turbine to a three wheel pack.

In one embodiment as shown in FIG. 2, the air cycle machine (ACM) 42 comprises a three wheel pack 70 having one compressor 72 mechanically coupled to one turbine 74 in series on the ACM shaft 78. In another embodiment, as shown in FIG. 3, the air cycle machine (ACM) 42 comprises a four wheel pack 120 with a compressor 72, a first turbine 74a, and a second turbine 74b mechanically coupled in series on the ACM shaft 78a.

The pack heat exchanger (HX) 44 (see FIGS. 2-6) is preferably coupled to and in fluid communication with the at least one compressor 72 (see FIGS. 2-6) of the ACM 42 (see FIGS. 2-6). The pack heat exchanger 44 (see FIGS. 2-6) preferably comprises a primary heat exchanger (PHX) 92 (see FIGS. 2-6) and a secondary heat exchanger (SHX) 94 (see FIGS. 2-6). Additional heat exchangers may also be used in the ACM pack system 10 (see FIGS. 2-6).

Figure 3:
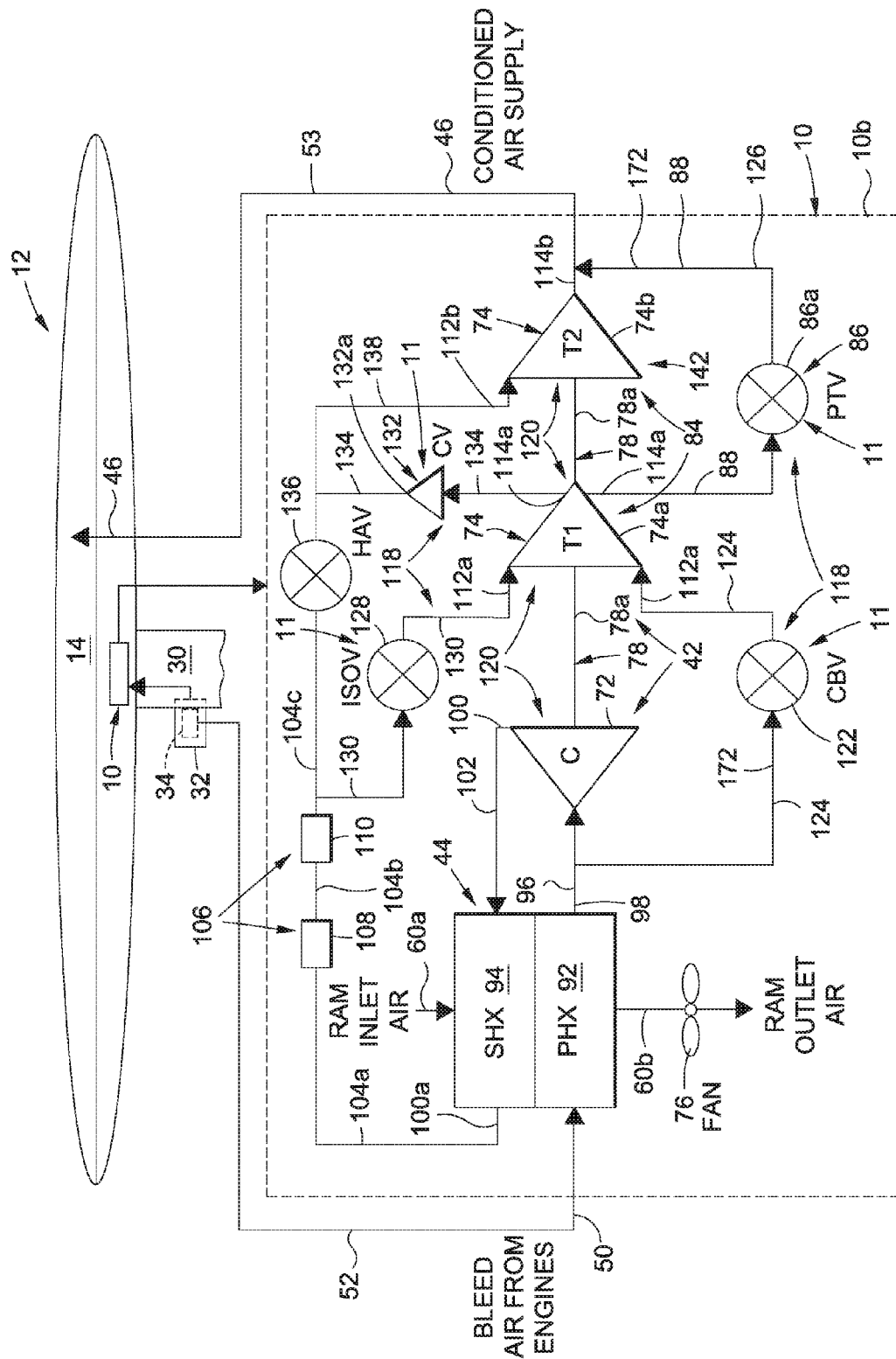
FIG. 3 is an illustration of a schematic diagram of another embodiment of an air cycle machine (ACM) pack system of the disclosure with a parallel turbine valve assembly to a four wheel pack.

The ACM pack system 10 (see FIGS. 2-7) further comprises a bypass air flow (BAF) assembly 11 (see FIGS. 2-7)

coupled in a parallel operation path 84 (see FIGS. 2, 3) to the ACM 42 (see FIGS. 2-3). In one embodiment, the bypass air flow assembly 11 (see FIGS. 2, 3) is a mechanical energy transfer bypass air flow assembly 11a (see FIG. 7). In another embodiment, the bypass air flow assembly 11 (see FIGS. 4-6) is a pneumatic energy transfer bypass air flow assembly 11b (see FIG. 7).

The bypass air flow assembly 11 (see FIGS. 2-7) has a bypass air flow regulating element 86, such as in the form of a parallel turbine valve (PTV) 86a. The bypass air flow assembly 11 (see FIGS. 2-7) transfers energy extracted by the bypass air flow assembly 11 (see FIGS. 2-7) to the ACM 42 (see FIGS. 2-7) to aid the air cycle machine (ACM) pack system 10 (see FIGS. 2-7) in cooling performance at a low inlet pressure 167 (see FIG. 7), such as a low inlet air pressure, resulting in an improved low inlet pressure cooling performance 168 (see FIG. 7) of the air cycle machine (ACM) pack system 10 (see FIGS. 2-7). A low inlet pressure 167 (see FIG. 7) at the inlet 41 (see FIG. 1) to the ACM pack system 10 (see FIG. 1) may typically be about 30 psi (pounds per square inch) or less when the aircraft 12 (see FIG. 1) is at a cruise mode of operation in flight. Such cruise mode of operation during flight may be a high altitude cruise typically above 30,000 feet. However, the low inlet pressure 167 (see FIG. 7) at the inlet 41 (see FIG. 1) may depend on the thrust and operating conditions of the aircraft 12 (see FIG. 1). An inlet pressure 166 (see FIG. 7) at the inlet 41 (see FIG. 1) to the ACM pack system 10 (see FIG. 1) may typically be about 50 psi when the aircraft 12 (see FIG. 1) is in a ground mode of operation.

FIG. 2 is an illustration of a schematic diagram of an embodiment of an air cycle machine (ACM) pack system 10, such as in the form of ACM pack system 10a, of the disclosure. having a parallel turbine 75 to a three wheel pack 70. In this embodiment as shown in FIG. 2, the air cycle machine (ACM) 42 comprises the three wheel pack 70 having one compressor 72 mechanically coupled to one turbine 74, such as first turbine 74a, in series on a shaft 78, such as an ACM shaft 78a.

In this embodiment, as shown in FIG. 2, the bypass air flow assembly 11 comprises a turbine 74, such as a second turbine 74b, mechanically coupled to a shaft 78, such as a turbine shaft 78b. Preferably, the turbine 74 (see FIG. 2) is a parallel turbine 75 (see FIG. 2).

In this embodiment, the bypass air flow assembly 11 (see FIG. 2) further comprises a mechanical drive element 80 (see FIG. 2) connecting the turbine shaft 78b (see FIG. 2) to the ACM shaft 78a (see FIG. 2) to drive the first turbine 74a (see FIG. 2) of the ACM 42 (see FIG. 2) and the parallel turbine 75 (see FIG. 2) of the bypass air flow assembly 11 (see FIG. 2) in the parallel operation path 84 (see FIG. 2). The mechanical drive element 80 (see FIG. 2) may be in the form of a mechanical shaft 80a (see FIG. 2), a geared shaft 80b (see FIG. 7), or another suitable element for mechanically driving the turbine 74 (see FIG. 2), such as in the form of first turbine 74a (see FIG. 2), of the ACM 42 (see FIG. 2) and the parallel turbine 75 (see FIG. 2). The mechanical drive element 80 (see FIG. 2) provides a means to transfer mechanical energy 170a (see FIG. 7) from the parallel turbine 75 (see FIG. 2) to the compressor 72 (see FIG. 2) of the ACM 42 (see FIG. 2). The mechanical drive element 80 (see FIG. 2) provides a means to drive the first turbine 74a (see FIG. 2) and the parallel turbine 75 (see FIG. 2) to allow for diversion of power. As shown in FIG. 2, a first end 82a of the mechanical drive element 80 is connected to the turbine shaft 78b, and a second end 82b of the mechanical drive element 80 is connected to the ACM shaft 78a, to drive the turbine 74 of the ACM 42 and the parallel turbine 75 of the bypass air flow assembly 11 in the parallel operation path 84 and to transfer mechanical energy 170a from the bypass air flow assembly 11 to the ACM 42.

The bypass air flow assembly 11 (see FIG. 2) further comprises various connective bypass ducts including a bypass duct 90 (see FIG. 2) which diverts outlet air 96 (see FIG. 2) from the primary heat exchanger 92 (see FIG. 2) as bypass air flow 172 (see FIG. 2) across the parallel turbine 75 (see FIG. 2). A PTV bypass duct 88 (see FIG. 2) may be added from the parallel turbine 75 (see FIG. 2) to the ACM 42 and the first turbine outlet air 114a duct, and the PTV 86a (see FIG. 2) is preferably coupled to the PTV bypass duct 88 (see FIG. 2).

In this embodiment, preferably, the bypass air flow regulating element 86 (see FIG. 2), such as in the form of parallel turbine valve (PTV) 86a (see FIG. 2), is coupled to the parallel turbine 75 (see FIG. 2) via the PTV bypass duct 88 (see FIG. 2). The PTV 86a (see FIG. 2) provides a diversion of power from the turbine shaft 78b to the ACM shaft 78a when the PTV 86a (see FIG. 2) opens to allow the parallel turbine 75 (see FIG. 2) to operate in parallel with the first turbine 74a (see FIG. 2).

The parallel turbine 75 (see FIG. 2) allows the compressor 72 (see FIG. 2) to operate at a more efficient design setting. When more air flow is provided by the bleed air 50 (see FIG. 2), it is diverted as bypass air flow 172 to the parallel turbine 75 (see FIG. 2) and extracted energy 170 (see FIG. 7) is recovered to be used to operate the compressor 72 (see FIG. 2) or other components within the ACM pack system 10 (see FIG. 2).

Thus, the parallel turbine 75 (see FIG. 2) drives additional energy or power to the compressor 72 (see FIG. 2) or other components within the ACM pack system 10 (see FIG. 2), and when the compressor 72 (see FIG. 2) gets an increase in energy or power over and above what it normally has, the compressor 72 (see FIG. 2) may pull or draw more air flow from the bleed air 50 (see FIG. 2) coming from the aircraft engine 32 (see FIG. 2) and at the same inlet pressure 166 (see FIG. 7). By running the bypass air flow 172 across the parallel turbine 75 (see FIG. 2), additional energy or power may be put back into the ACM 42 (see FIG. 2) or other components in the ACM pack system 10, thus, allowing the ACM pack system 10 to have an increased efficiency and an increased cooling performance.

FIG. 2 shows the bleed air 50 from the bleed air system 34 in the aircraft engine 32 flowing via the bleed air duct 52 into the primary heat exchanger 92 of the pack heat exchanger 44. As further shown in FIG. 2, outlet air 96 flows through duct 98 to the compressor 72 of the ACM 42. The outlet air 96 (see FIG. 2) is compressed in the compressor 72 (see FIG. 2) and is discharged as compressor outlet air 100 (see FIG. 2) via duct 102. As further shown in FIG. 2, the compressor outlet air 100 gets cooled in the secondary heat exchanger 94 by ram inlet air 60a flowing into the secondary heat exchanger 94 and flowing out as ram outlet air 60b which may be optionally further motivated by a fan 76.

FIG. 2 further shows the cooled compressor outlet air 100a flowing via ducts 104a, 104b, 104c through the water separation system 106 comprising a condenser heat exchanger 108 and a water collector 110 and discharged as first turbine inlet air 112a which is expanded through the first turbine 74a and discharged as first turbine outlet air 114a to obtain the conditioned air supply 46 which flows via air duct 53 to the aircraft cabin 14.

FIG. 3 is an illustration of a schematic diagram of another embodiment of an air cycle machine (ACM) pack system 10, such as in the form of ACM pack system 10b, of the disclosure with a parallel turbine valve assembly 118 to a four wheel pack 120. In this embodiment, as shown in FIG. 3, the air cycle machine (ACM) 42 comprises the four wheel pack 120 with a compressor 72, and two turbines 74, such as in the form of a first turbine 74a and a second turbine 74b, mechanically coupled in series on the ACM shaft 78a.

In this embodiment, the bypass air flow assembly 11 (see FIG. 3), such as in the form of bypass mechanical energy transfer bypass air flow assembly 11a (see FIG. 7), comprises a parallel turbine valve assembly 118 (see FIG. 3) coupled to the ACM 42 (see FIG. 3). The parallel turbine valve assembly 118 (see FIG. 3) preferably comprises a compressor bypass valve (CBV) 122 (see FIG. 3), an isolation valve (ISOV) 128 (see FIG. 3), a check valve 132 (see FIG. 3), such as a four wheel pack check valve 132a (see FIG. 3), and the bypass air flow regulating element 86 (see FIG. 3), such as in the form of parallel turbine valve (PTV) 86a (see FIG. 3).

The bypass air flow assembly 11 (see FIG. 3) further comprises various connective bypass ducts including a CBV bypass duct 124 (see FIG. 3) which diverts outlet air 96 (see FIG. 3) from the primary heat exchanger 92 (see FIG. 3) as bypass air flow 172 (see FIG. 3) across the first turbine 74a (see FIG. 3). The CBV 122 (see FIG. 3) is preferably coupled to the CBV bypass duct 124. A PTV bypass duct 126 (see FIG. 3) may be added which diverts bypass air flow 172 from the first turbine 74a (see FIG. 3) to the air duct 53 with the second turbine outlet air 114b that becomes the conditioned air supply 46. The PTV 86a (see FIG. 3) is preferably coupled to the PTV bypass duct 126 (see FIG. 3).

When the aircraft 12 housing the ACM pack system 10b shown in FIG. 3 is in a cruise mode of operation, the ISOV 128 is open until the parallel turbine valve assembly 118 is ready to run in parallel. With the HAV 136 (see FIG. 3) open, the ISOV 128 (see FIG. 3) is closed, the CBV 122 (see FIG. 3) is open to run bypass air flow 172 across the first turbine 74a, and the PTV 86a (see FIG. 3) is gradually opened, to forestall loss of cooling while maintaining air flow as inlet pressure decreases. The check valve 132 (see FIG. 3) checks to make sure the air flow does not go the wrong way. The PTV 86a (see FIG. 3), when opened, effectively aligns the first turbine 74a with the second turbine 74b. Thus, the first turbine 74a (see FIG. 3) which is unused when the HAV 136 (see FIG. 3) is open is re-tasked and used in parallel by the parallel turbine valve assembly 118 (see FIG. 3). When the CBV 122 (see FIG. 3) and PTV 86a (see FIG. 3) are open, the ISOV 128 (see FIG. 3) is closed.

FIG. 3 shows the bleed air 50 from the bleed air system 34 in the aircraft engine 32 flowing via the bleed air duct 52 into the primary heat exchanger 92 of the pack heat exchanger 44. As further shown in FIG. 3, outlet air 96 flows through duct 98 to the compressor 72 of the ACM 42. The outlet air 96 (see FIG. 3) is compressed in the compressor 72 (see FIG. 2) and is discharged as compressor outlet air 100 (see FIG. 2) via duct 102 (see FIG. 3). As further shown in FIG. 3, the compressor outlet air 100 (see FIG. 3) gets cooled in the secondary heat exchanger 94 (see FIG. 3) by ram inlet air 60a (see FIG. 3) flowing into the secondary heat exchanger 94 (see FIG. 3) and flowing out as ram outlet air 60b (see FIG. 3) which may be optionally further motivated by a fan 76 (see FIG. 2).

FIG. 3 further shows the cooled compressor outlet air 100a flowing via ducts 104a, 104b, 104c through the water separation system 106 comprising the condenser heat exchanger 108 and the water collector 110 and discharged as either first turbine inlet air 112a to the first turbine 74a or second turbine inlet air 112b to the second turbine 74b. The first turbine inlet air 112a (see FIG. 3) flows via an ISOV duct 130 (see FIG. 3) through the ISOV 128 (see FIG. 3) when the ISOV 128 (see FIG. 3) is open and the HAV 136 (see FIG. 3) is closed. The first turbine inlet air 112a (see FIG. 3) is expanded through the first turbine 74a (see FIG. 3) and discharged as first turbine outlet air 114a (see FIG. 3) and flows via a check valve duct 134 (see FIG. 3) through the check valve 132 (see FIG. 3), such as in the form of four wheel pack check valve 132a (see FIG. 3).

The second turbine inlet air 112b (see FIG. 3) flows via an HAV duct 138 (see FIG. 3) when the ISOV 128 (see FIG. 3) is closed and the HAV 136 (see FIG. 3) is open. The second turbine inlet air 112b (see FIG. 3) is expanded through the second turbine 74b (see FIG. 3) and discharged as second turbine outlet air 114b (see FIG. 3) to obtain the conditioned air supply 46 (see FIG. 3) which flows via air duct 53 (see FIG. 3) to the aircraft cabin 14 (see FIG. 3).

Figure 4:
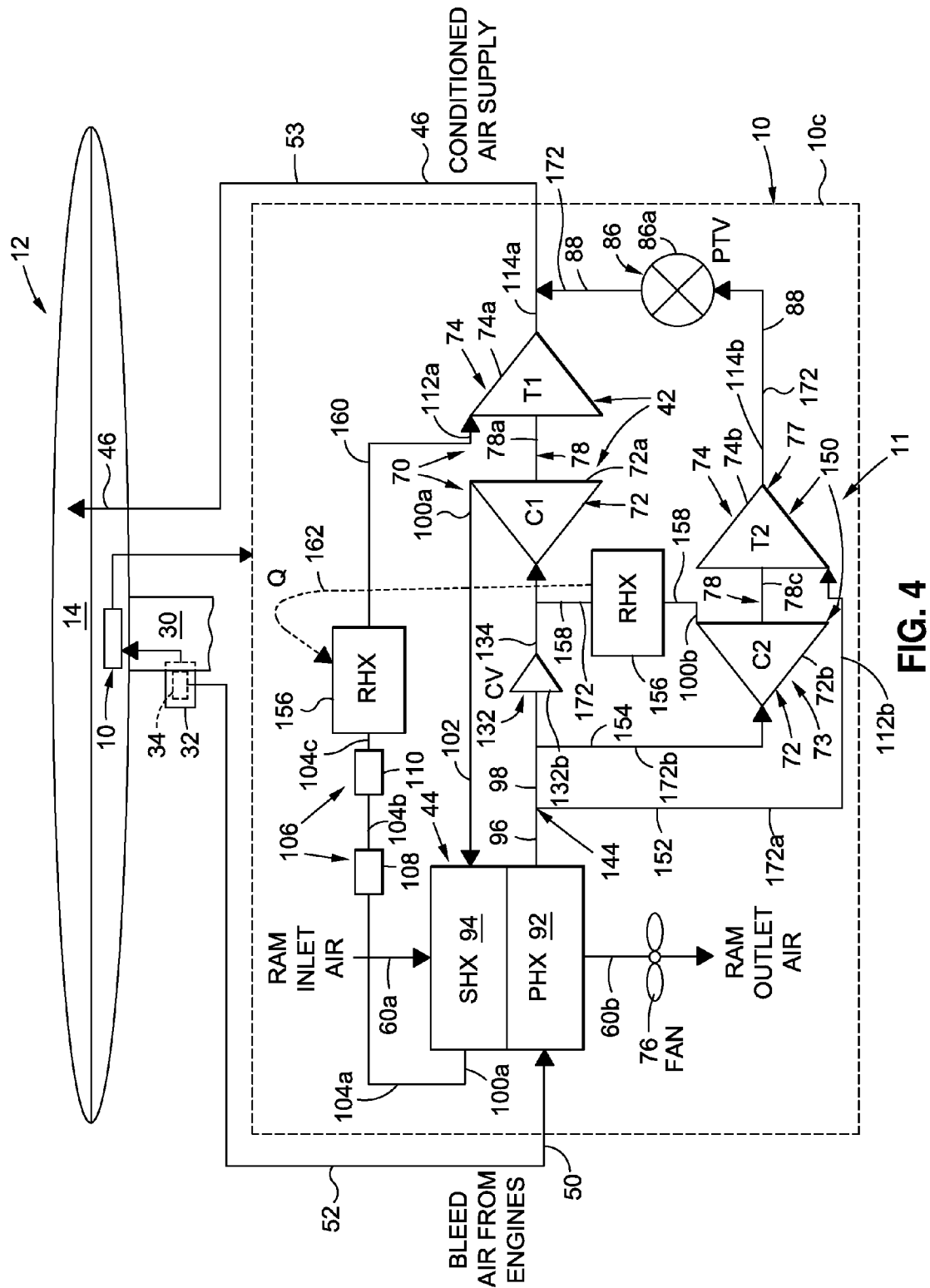
FIG. 4 is an illustration of a schematic diagram of another embodiment of an air cycle machine (ACM) pack system of the disclosure with a first embodiment of a turbo-compressor (TC) assembly to a three wheel pack.

FIG. 4 is an illustration of a schematic diagram of another embodiment of an air cycle machine (ACM) pack system 10, such as in the form of ACM pack system 10c, of the disclosure with a first embodiment of a turbo-compressor (TC) assembly 150 to a three wheel pack 70.

In this embodiment as shown in FIG. 4, the air cycle machine (ACM) 42 comprises the three wheel pack 70 having one compressor 72, such as in the form of first compressor 72a, mechanically coupled to one turbine 74, such as in the form of first turbine 74a, in series on a shaft 78, such as an ACM shaft 78a.

In this embodiment, the bypass air flow assembly 11 (see FIG. 4), such as in the form of, pneumatic energy transfer bypass air flow assembly 11b (see FIG. 7), comprises a turbo-compressor (TC) assembly 150 coupled to a regeneration heat exchanger 156 and a check valve 132, such as a three wheel pack check valve 132b. The TC assembly 150, the regeneration heat exchanger 156 and a check valve 132 are all coupled to the ACM 42. In this embodiment, the flow regulating element 86, such as in the form of parallel turbine valve (PTV) 86a, is coupled to the TC assembly 150 via PTV duct 88.

The bypass air flow assembly 11 (see FIG. 4) further comprises various connective bypass ducts including a bypass duct 152 (see FIG. 4) which diverts outlet air 96 (see FIG. 4) from the primary heat exchanger 92 (see FIG. 4) as bypass air flow 172a (see FIG. 4) across the TC turbine 77 (see FIG. 4). The PTV bypass duct 88 (see FIG. 4) may be added from the TC turbine 77 (see FIG. 4) to the ACM 42 (see FIG. 4) and the first turbine outlet air 114a duct, and the PTV 86a (see FIG. 4) is preferably coupled to the PTV bypass duct 88 (see FIG. 4).

The bypass air flow assembly 11 (see FIG. 4) further comprises bypass duct 154 (see FIG. 4) that diverts outlet air 96 (see FIG. 4) from the primary heat exchanger 92 (see FIG. 4) as bypass air flow 172b (see FIG. 4) through the TC compressor 73 (see FIG. 4) and through a regeneration heat exchanger 156 via duct 158. One or more regeneration heat exchangers 156 may be added to reduce the temperature at the compressor 72a (see FIG. 4) to make the compressor 72a more efficient.

In this embodiment, which transfers pneumatic power or energy from the bypass air flow assembly 11 to the ACM 42 (see FIG. 4), the bypass air flow 172a (see FIG. 4) flows via bypass duct 152 across the TC turbine 77 (see FIG. 4). In addition, bypass air flow 172b flows via bypass duct 154 to TC compressor 73 and gets a pressure increase as it flows up to the first compressor 72a. The regeneration heat exchanger 156 (see FIG. 4) transfers heat 162 (Q) (see FIG. 4), so that the first compressor 72a (see FIG. 4) gets a lower inlet temperature (see FIG. 4) and the regeneration heat exchanger 156 (see FIG. 4) also heats the air going into the first turbine 74a (see FIG. 4) which make it more efficient as well.

In this embodiment with the addition of a turbo-compressor assembly 150 (see FIG. 4) to a three wheel pack 70 (see FIG. 4), the bypass air flow 172a (see FIG. 4) is pulled at a point 144 (see FIG. 4) after the primary heat exchanger 92 (see FIG. 4). With this pneumatic energy 170b (see FIG. 7) transfer embodiment, the PTV 86a (see FIG. 4) is opened gradually to forestall the loss of cooling while maintaining flow as inlet pressure decreases.

FIG. 4 shows the bleed air 50 from the bleed air system 34 in the aircraft engine 32 flowing via the bleed air duct 52 into the primary heat exchanger 92 of the pack heat exchanger 44. As further shown in FIG. 4, outlet air 96 flows through duct 98 and through check valve 132, such as in the form of a three wheel pack check valve 132b, to the compressor 72, such as first compressor 72a, of the ACM 42. The outlet air 96 (see FIG. 4) is compressed in the compressor 72 (see FIG. 4) and is discharged as compressor outlet air 100 (see FIG. 4) via duct 102 (see FIG. 4). As further shown in FIG. 4, the compressor outlet air 100 gets cooled in the secondary heat exchanger 94 by ram inlet air 60a flowing into the secondary heat exchanger 94 and flowing out as ram outlet air 60b which may be optionally further motivated by a fan 76 (see FIG. 4).

FIG. 4 further shows the cooled compressor outlet air 100a flowing via ducts 104a, 104b, 104c through the water separation system 106 comprising a condenser heat exchanger 108 and a water collector 110 and discharged as first turbine inlet air 112a which is expanded through the first turbine 74a and discharged as first turbine outlet air 114a to obtain the conditioned air supply 46 which flows via air duct 53 to the aircraft cabin 14.

Figure 5:
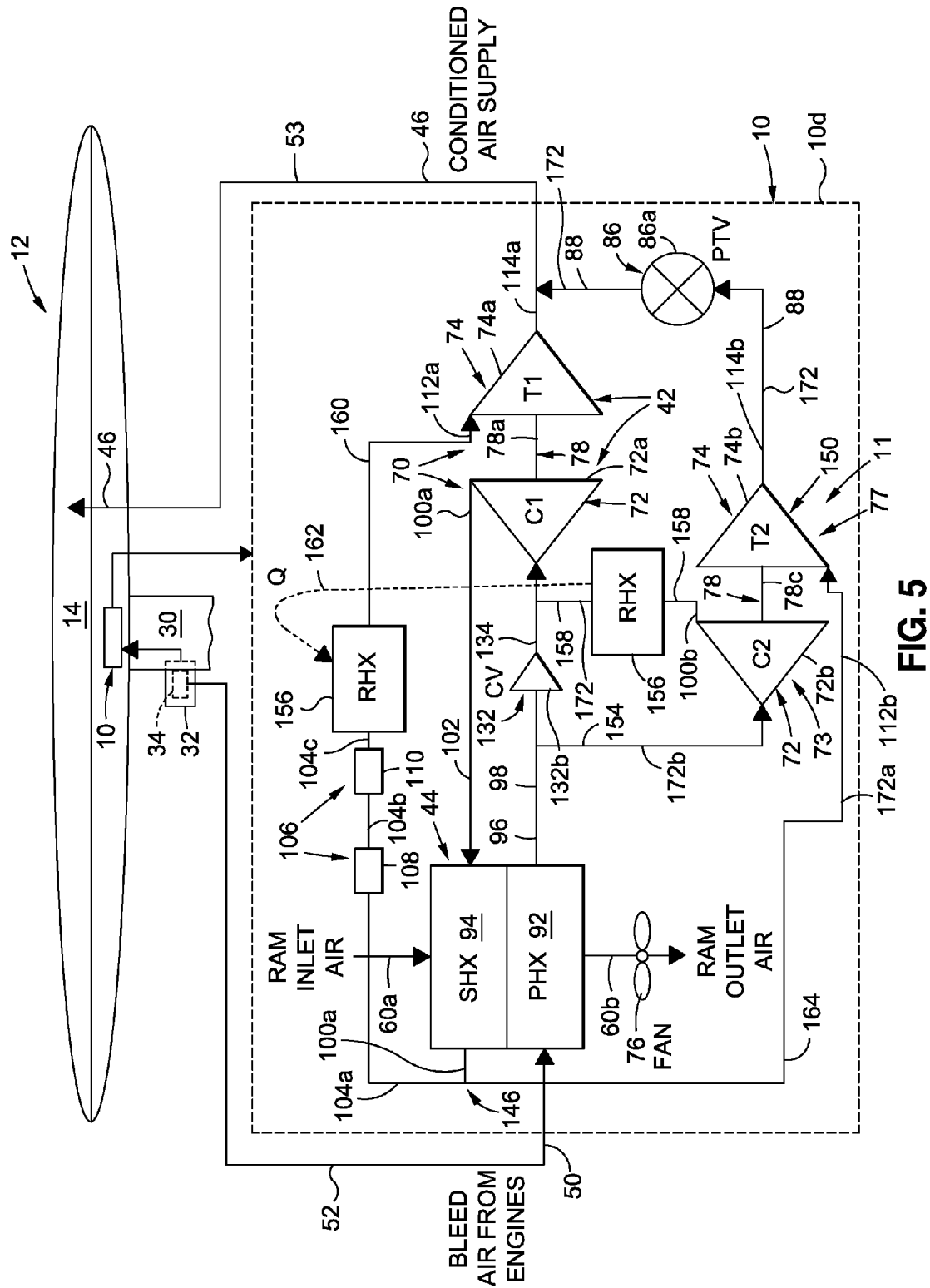
FIG. 5 is an illustration of a schematic diagram of another embodiment of an air cycle machine (ACM) pack system of the disclosure with a second embodiment of a turbo-compressor (TC) assembly to a three wheel pack.

FIG. 5 is an illustration of a schematic diagram of another embodiment of an air cycle machine (ACM) pack system 10, such as in the form of ACM pack system 10d, of the disclosure with a second embodiment of a turbo-compressor (TC) assembly 150 to a three wheel pack 70.

In this embodiment as shown in FIG. 5, the air cycle machine (ACM) 42 comprises the three wheel pack 70 having one compressor 72, such as in the form of first compressor 72a, mechanically coupled to one turbine 74, such as in the form of first turbine 74a, in series on a shaft 78, such as an ACM shaft 78a.

In this embodiment, the bypass air flow assembly 11 (see FIG. 5), such as in the form of, pneumatic energy transfer bypass air flow assembly 11b (see FIG. 7), comprises a turbo-compressor (TC) assembly 150 coupled to a regeneration heat exchanger 156 and a check valve 132, such as a three wheel pack check valve 132b. The TC assembly 150, the regeneration heat exchanger 156 and a check valve 132 are all coupled to the ACM 42. In this embodiment, the flow regulating element 86, such as in the form of parallel turbine valve (PTV) 86a, is coupled to the TC assembly 150 via PTV duct 88.

The bypass air flow assembly 11 (see FIG. 5) further comprises various connective bypass ducts including bypass duct 154 (see FIG. 5) that diverts outlet air 96 (see FIG. 5) from the primary heat exchanger 92 (see FIG. 5) as bypass air flow 172b (see FIG. 5) through the TC compressor 73 (see FIG. 5) and through the regeneration heat exchanger 156 via duct 158. One or more regeneration heat exchangers 156 may be added to reduce the temperature at the compressor 72a (see FIG. 5) to make the compressor 72a more efficient.

The PTV bypass duct 88 (see FIG. 5) may be added from the TC turbine 77 (see FIG. 5) to the ACM 42 (see FIG. 5) and the first turbine outlet air 114a duct, and the PTV 86a (see FIG. 5) is preferably coupled to the PTV bypass duct 88 (see FIG. 5).

In addition, a bypass duct 164 (see FIG. 5) is added from the secondary heat exchanger 94 which diverts cooled compressor outlet air 100a (see FIG. 5) from the secondary heat exchanger 94 (see FIG. 5) as bypass air flow 172a (see FIG. 5) across the TC turbine 77 (see FIG. 5).

In this embodiment, which transfers pneumatic power or energy from the bypass air flow assembly 11 to the ACM 42 (see FIG. 5), the bypass air flow 172a (see FIG. 5) flows via bypass duct 164 across the TC turbine 77 (see FIG. 5). In addition, bypass air flow 172b flows via bypass duct 154 to TC compressor 73 and gets a pressure increase as it flows up to the first compressor 72a. The regeneration heat exchanger 156 (see FIG. 5) transfers heat 162 (Q) (see FIG. 5), so that the first compressor 72a (see FIG. 5) gets a lower inlet temperature (see FIG. 5) and the regeneration heat exchanger 156 (see FIG. 5) also heats the air going into the first turbine 74a (see FIG. 5) which make it more efficient as well.

In this embodiment with the addition of a turbo-compressor assembly 150 (see FIG. 5) to a three wheel pack 70 (see FIG. 5), the bypass air flow 172a (see FIG. 5) is pulled at a point 146 (see FIG. 4) after the secondary heat exchanger 94 (see FIG. 5) when the air flow is cooler and has a lower pressure. With this pneumatic energy 170b (see FIG. 7) transfer embodiment, the PTV 86a (see FIG. 5) is opened gradually to forestall the loss of cooling while maintaining flow as inlet pressure decreases.

FIG. 5 shows the bleed air 50 from the bleed air system 34 in the aircraft engine 32 flowing via the bleed air duct 52 into the primary heat exchanger 92 of the pack heat exchanger 44. As further shown in FIG. 5, outlet air 96 flows through duct 98 and through check valve 132, such as in the form of a three wheel pack check valve 132b, to the compressor 72, such as first compressor 72a, of the ACM 42. The outlet air 96 (see FIG. 5) is compressed in the compressor 72 (see FIG. 5) and is discharged as compressor outlet air 100 (see FIG. 5) via duct 102 (see FIG. 5). As further shown in FIG. 5, the compressor outlet air 100 gets cooled in the secondary heat exchanger 94 by ram inlet air 60a flowing into the secondary heat exchanger 94 and flowing out as ram outlet air 60b which may be optionally further motivated by a fan 76 (see FIG. 5).

FIG. 5 further shows the cooled compressor outlet air 100a flowing via ducts 104a, 104b, 104c through the water separation system 106 comprising a condenser heat exchanger 108 and a water collector 110, goes through the regeneration heat exchanger 156, and flows via duct 160 and gets discharged as first turbine inlet air 112a. The first turbine inlet air 112a is expanded through the first turbine 74a and discharged as first turbine outlet air 114a to obtain the conditioned air supply 46 which flows via air duct 53 to the aircraft cabin 14.

Figure 6:
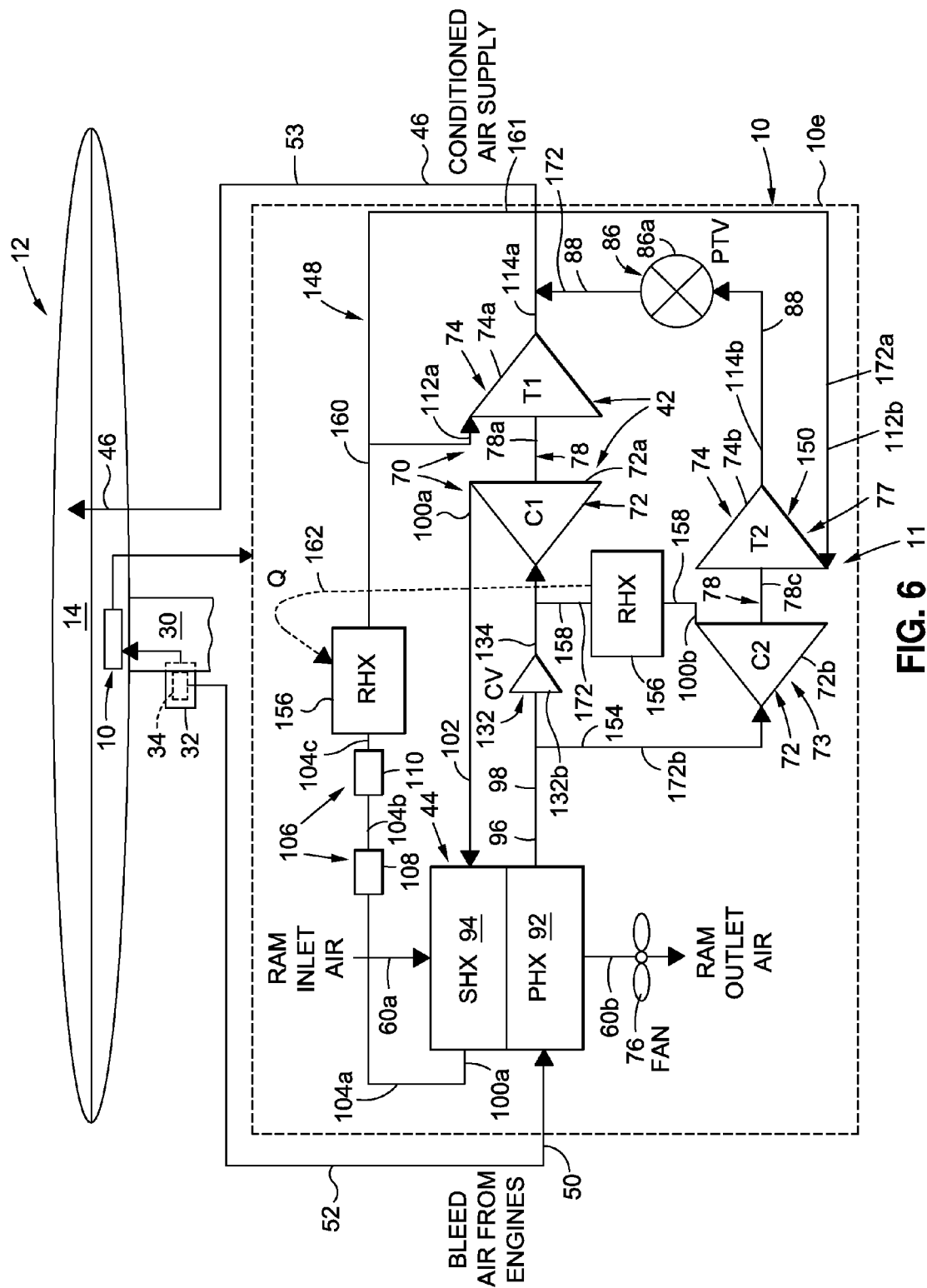
FIG. 6 is an illustration of a schematic diagram of another embodiment of an air cycle machine (ACM) pack system of the disclosure with a third embodiment of a turbo-compressor (TC) assembly to a three wheel pack.

FIG. 6 is an illustration of a schematic diagram of another embodiment of an air cycle machine (ACM) pack system 10, such as in the form of ACM pack system 10e, of the disclosure with a third embodiment of a turbo-compressor (TC) assembly 150 to a three wheel pack 70.

In this embodiment as shown in FIG. 6, the air cycle machine (ACM) 42 comprises the three wheel pack 70 having one compressor 72, such as in the form of first compressor 72*a*, mechanically coupled to one turbine 74, such as in the form of first turbine 74*a*, in series on a shaft 78, such as an ACM shaft 78*a*.

In this embodiment, the bypass air flow assembly 11 (see FIG. 6), such as in the form of, pneumatic energy transfer bypass air flow assembly 11*b* (see FIG. 7), comprises a turbo-compressor (TC) assembly 150 coupled to a regeneration heat exchanger 156 and a check valve 132, such as a three wheel pack check valve 132*b*. The TC assembly 150, the regeneration heat exchanger 156 and a check valve 132 are all coupled to the ACM 42. In this embodiment, the flow regulating element 86, such as in the form of parallel turbine valve (PTV) 86*a*, is coupled to the TC assembly 150 via PTV duct 88.

The bypass air flow assembly 11 (see FIG. 6) further comprises various connective bypass ducts including bypass duct 154 (see FIG. 6) that diverts outlet air 96 (see FIG. 6) from the primary heat exchanger 92 (see FIG. 6) as bypass air flow 172*b* (see FIG. 6) through the TC compressor 73 (see FIG. 6) and through the regeneration heat exchanger 156 via duct 158. One or more regeneration heat exchangers 156 may be added to reduce the temperature at the compressor 72*a* (see FIG. 6) to make the compressor 72*a* more efficient.

The PTV bypass duct 88 (see FIG. 6) may be added from the TC turbine 77 (see FIG. 6) to the ACM 42 (see FIG. 6) and the first turbine outlet air 114*a* duct, and the PTV 86*a* (see FIG. 6) is preferably coupled to the PTV bypass duct 88 (see FIG. 6).

In addition, a bypass duct 161 (see FIG. 6) is added after the heat exchangers, including the primary heat exchanger 92, the secondary heat exchanger 94, and the regeneration heat exchanger 156, which diverts first turbine inlet air 112*a* (see FIG. 6) from the water separation system 106 and regeneration heat exchanger 156 (see FIG. 6) as bypass air flow 172*a* (see FIG. 6) across the TC turbine 77 (see FIG. 6).

In this embodiment, which transfers pneumatic power or energy 170*b* (see FIG. 7) from the bypass air flow assembly 11 to the ACM 42 (see FIG. 6), the bypass air flow 172*a* (see FIG. 6) flows via bypass duct 161 across the TC turbine 77 (see FIG. 6). In addition, bypass air flow 172*b* flows via bypass duct 154 (see FIG. 6) to TC compressor 73 (see FIG. 6) and gets a pressure increase as it flows up to the first compressor 72*a* (see FIG. 6). The regeneration heat exchanger 156 (see FIG. 5) transfers heat 162 (Q) (see FIG. 6), so that the first compressor 72*a* (see FIG. 6) gets a lower inlet temperature (see FIG. 6) and the regeneration heat exchanger 156 (see FIG. 6) also heats the air going into the first turbine 74*a* (see FIG. 6) which make it more efficient as well.

In this embodiment with the addition of a turbo-compressor assembly 150 (see FIG. 6) to a three wheel pack 70 (see FIG. 6), the bypass air flow 172*a* (see FIG. 6) is pulled at a point 148 (see FIG. 6) after the regeneration heat exchanger 156 (see FIG. 6) when the air flow is at its lowest pressure. With this pneumatic energy 170*b* (see FIG. 7) transfer embodiment, the PTV 86*a* (see FIG. 6) is opened gradually to forestall the loss of cooling while maintaining flow as inlet pressure decreases.

FIG. 6 shows the bleed air 50 from the bleed air system 34 in the aircraft engine 32 flowing via the bleed air duct 52 into the primary heat exchanger 92 of the pack heat exchanger 44. As further shown in FIG. 6, outlet air 96 flows through duct 98 and through check valve 132, such as in the form of a three wheel pack check valve 132*b*, to the compressor 72, such as first compressor 72*a*, of the ACM 42. The outlet air 96 (see FIG. 6) is compressed in the compressor 72 (see FIG. 6) and is discharged as compressor outlet air 100 (see FIG. 6) via duct 102 (see FIG. 6). As further shown in FIG. 6, the compressor outlet air 100 gets cooled in the secondary heat exchanger 94 by ram inlet air 60*a* flowing into the secondary heat exchanger 94 and flowing out as ram outlet air 60*b* which may be optionally further motivated by a fan 76 (see FIG. 6).

FIG. 6 further shows the cooled compressor outlet air 100*a* flowing via ducts 104*a*, 104*b*, 104*c* through the water separation system 106 comprising a condenser heat exchanger 108 and a water collector 110, and flows via duct 160 and gets discharged as first turbine inlet air 112*a*. The first turbine inlet air 112*a* (see FIG. 6) is expanded through the first turbine 74*a* (see FIG. 6) and discharged as first turbine outlet air 114*a* (see FIG. 6) to obtain the conditioned air supply 46 (see FIG. 6) which flows via air duct 53 (see FIG. 6) to the aircraft cabin 14 (see FIG. 6). Alternatively, the first turbine inlet air 112*a* (see FIG. 6) bypasses the first turbine 74*a* (see FIG. 6) and flows as bypass air flow 172*a* (see FIG. 6) via a bypass duct 161 (see FIG. 6) to the second turbine 74*b* (see FIG. 6), such as in the form of TC turbine 77 (see FIG. 6). The bypass air flow 172*a* (see FIG. 6) flows across the second turbine 74*b* (see FIG. 6) and through the PTV 86*a* (see FIG. 6) and to the ACM 42 (see FIG. 6) and the first turbine outlet air 114*a* (see FIG. 6) to obtain the conditioned air supply 46 which flows via air duct 53 (see FIG. 6) to the aircraft cabin 14 (see FIG. 6).

In another embodiment there is provided an aircraft 12 having an embodiment of the air cycle machine (ACM) pack system 10, discussed above. FIG. 7 is an illustration of a functional block diagram of one of the embodiments of the aircraft 12 showing the aircraft air conditioning system 40 that may include one or more embodiments of the air cycle machine (ACM) pack system 10.

As shown in FIG. 7, the aircraft 12 comprises one or more aircraft engines 32, each aircraft engine 32 preferably having a bleed air system 34 for generating bleed air 50. The aircraft 12 may further comprise at least one wing 30. However, the aircraft 12 may also comprise rotorcraft with rotors and without wings. As shown in FIG. 7, the aircraft 12 further comprises a fuselage 13 defining an interior volume 15 (see FIG. 1) having an aircraft cabin 14 and a pack bay 36 separate from the aircraft cabin 14. As further shown in FIG. 7, the aircraft 12 further comprises an aircraft air conditioning system 40 positioned in the pack bay 36 and in fluid communication with the aircraft cabin 14. The aircraft air conditioning system 40 comprises an air cycle machine (ACM) pack system 10.

The ACM pack system 10, as discussed above, comprises an air cycle machine (ACM) 42 comprising at least one compressor 72 mechanically coupled to at least one turbine 74 in series on an ACM shaft 78*a*. The ACM pack system 10 further comprises a pack heat exchanger 44 coupled to and in fluid communication with the at least one compressor 72 of the ACM 42. The ACM pack system 10 further comprises a bypass air flow assembly 11 (see FIGS. 2-7) coupled in a parallel operation path 84 to the ACM 42. The bypass air flow assembly 11 (see FIGS. 2-7) has a parallel turbine valve 86*a*. The bypass air flow assembly 11 (see FIGS. 2-7) transfers energy extracted by the bypass air flow assembly 11 (see FIGS. 2-7) to the ACM 42 to aid the ACM pack system 10 in cooling performance at a low inlet pressure 167 (see FIG. 7), such as a low inlet air pressure, resulting in an improved low inlet pressure cooling performance 168 (see FIG. 7) of the ACM pack system 10.

As discussed above, in one embodiment as shown in FIG. 2, the air cycle machine (ACM) 42 comprises a three wheel pack 70 having one compressor 72 mechanically coupled to one turbine 74 in series on the ACM shaft 78. In another embodiment, as shown in FIG. 3, the air cycle machine (ACM) 42 comprises a four wheel pack 120 with a compressor 72, a first turbine 74a, and a second turbine 74b mechanically coupled in series on the ACM shaft 78a.

In one embodiment as shown in FIG. 2, the bypass air flow assembly 11 comprises a parallel turbine 75 coupled to a turbine shaft 78b. In this embodiment, the bypass air flow assembly 11 further comprises a mechanical drive element 80 connecting the turbine shaft 78b to the ACM shaft 78a to drive the turbine 74 of the ACM 42 and the parallel turbine 75 of the bypass air flow assembly 11 in the parallel operation path 84 and to transfer mechanical energy 170a (see FIG. 7) from the bypass air flow assembly 10 to the ACM 42. The mechanical drive element 80 may comprise a mechanical shaft 80a, a geared shaft 80b, or another suitable element for mechanically driving the turbine 74 of the ACM 42 and the parallel turbine 75. In this embodiment, preferably, the bypass air flow regulating element 86, such as in the form of parallel turbine valve (PTV) 86a, is coupled to the parallel turbine 75.

In another embodiment, as shown in FIG. 3, the bypass air flow assembly 11, such as in the form of bypass mechanical energy transfer bypass air flow assembly 11a, comprises a parallel turbine valve assembly 118 coupled to the ACM 42, where the ACM 42 is a four wheel pack 120. The parallel turbine valve assembly 118 preferably comprises a compressor bypass valve (CBV) 122, an isolation valve (ISOV) 128, a check valve 132a, and the parallel turbine valve (PTV) 86a. The parallel turbine valve assembly 118 transfers mechanical energy 170a (see FIG. 7) from the bypass air flow assembly 11 to the ACM 42.

In another embodiment, as shown in FIG. 4, the bypass air flow assembly 11, such as in the form of pneumatic energy transfer bypass air flow assembly 11b, comprises a turbo-compressor assembly 150 coupled to a regeneration heat exchanger 156 and a check valve 132b, which are all coupled to the ACM 42. In this embodiment, the flow regulating element 86, such as in the form of parallel turbine valve (PTV) 86a, is coupled to the turbo-compressor assembly 150. In this embodiment, the turbo-compressor assembly 150 transfers pneumatic energy 170b from the bypass air flow assembly 11 to the ACM 42.

Figure 8:
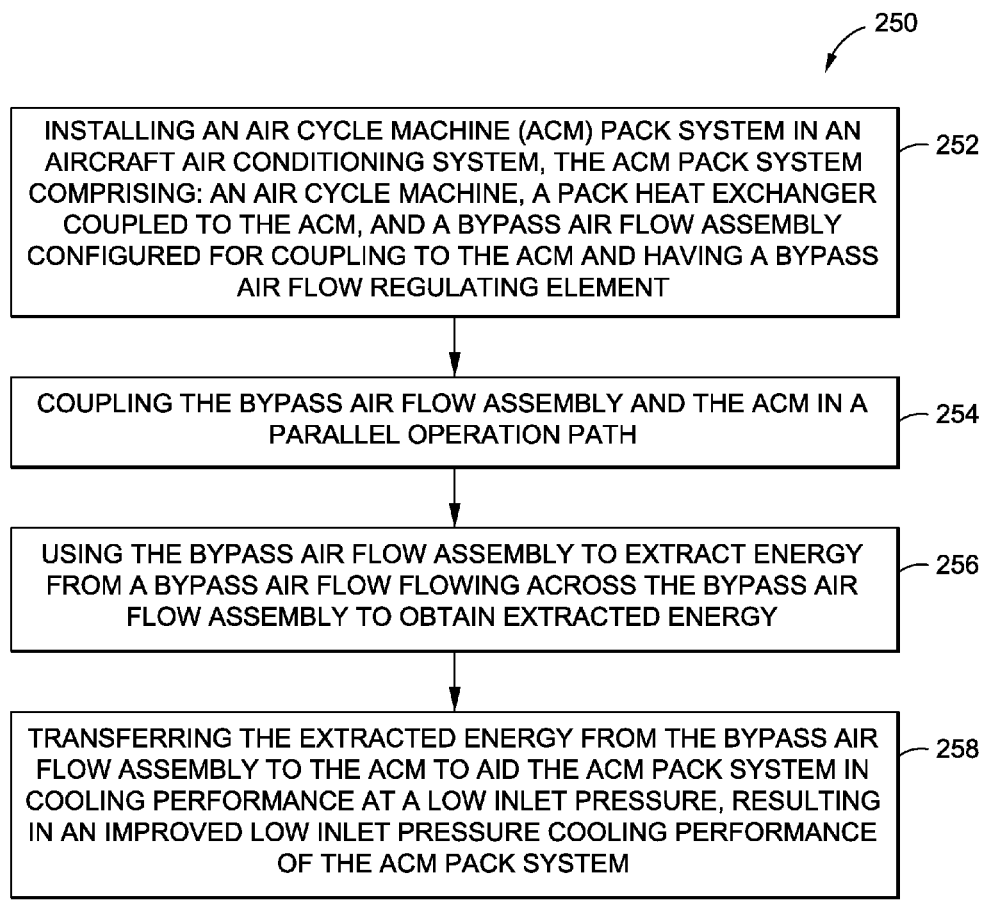
FIG. 8 is an illustration of a flow diagram showing an embodiment of a method of the disclosure.

In another embodiment there is provided a method 250 for improving low inlet pressure cooling performance 168 (see FIG. 7) of an air cycle machine (ACM) pack system 10 (see FIGS. 1-7). FIG. 8 is an illustration of a flow diagram showing an embodiment of the method 250 of the disclosure.

As shown in FIG. 8, the method 250 comprises step 252 of installing the air cycle machine (ACM) pack system 10, 10a-10e (see FIGS. 1-7) in the aircraft air conditioning system 40 (see FIG. 7) of an aircraft (see FIGS. 1, 7). As discussed in detail above, the ACM pack system 10, 10a-10e (see FIGS. 1-7) comprises the air cycle machine (ACM) 42 (see FIGS. 1-7) comprising at least one compressor 72 (see FIG. 2-7) mechanically coupled to at least one turbine 74 (see FIGS. 2-7) in series on an ACM shaft 78a (see FIGS. 2-7). The ACM pack system 10, 10a-10e (see FIGS. 1-7) further comprises a pack heat exchanger (HX) 44 (see FIGS. 1-7) coupled to and in fluid communication with the at least one compressor 72 (see FIG. 2-7) of the ACM 42 (see FIG. 1-7). The ACM pack system 10, 10a-10e (see FIGS. 1-7) further comprises a bypass air flow assembly 11 (see FIGS. 2-7) configured for coupling to the ACM (see FIG. 1-7) and having a bypass air flow regulating element 86 (see FIGS. 2-7).

In one embodiment, the installing step 252 comprises installing an ACM 42 (see FIGS. 2, 4-6) comprising a three wheel pack 70 (see FIGS. 2, 4-6) having one compressor 72 (see FIGS. 2, 4-6) mechanically coupled in series to one turbine 74 (see FIGS. 2, 4-6) on the ACM shaft 78a (see FIGS. 2, 4-6). The installing step 252 may further comprise installing the bypass air flow assembly 11 (see FIGS. 2, 4-6) to the three wheel pack 70 (see FIGS. 2, 4-6). In one embodiment, the bypass air flow assembly 11 (see FIG. 2) comprises a parallel turbine 75 (see FIG. 2) coupled to a turbine shaft 78b (see FIG. 2). A mechanical drive element 80 (see FIG. 2) is preferably installed between the parallel turbine 75 (see FIG. 2) and the ACM 42 (see FIG. 2). More preferably, a first end 82a (see FIG. 2) of the mechanical drive element 80 (see FIG. 2) is connected to the turbine shaft 78b (see FIG. 2), and a second end 82b (see FIG. 2) of the mechanical drive element 80 (see FIG. 2) is connected to the ACM shaft 78a (see FIG. 2) to drive the turbine 74 (see FIG. 2) of the ACM 42 (see FIG. 2) and the parallel turbine 75 (see FIG. 2) of the bypass air flow assembly 11 (see FIG. 2) in the parallel operation path 84 (see FIG. 2) and to transfer mechanical energy 170a (see FIG. 7) from the bypass air flow assembly 11 (see FIG. 2) to the ACM 42 (see FIG. 2).

In another embodiment of installing the bypass air flow assembly 11 (see FIGS. 4-6) to the three wheel pack 70 (see FIGS. 4-6), the installing step 252 may further comprise installing the bypass air flow assembly 11 (see FIG. 4-7) comprising a turbo-compressor (TC) assembly 150 (see FIGS. 4-6) to the three wheel pack 70 (see FIGS. 4-6). The TC assembly 150 (see FIGS. 4-6) is preferably coupled to a regeneration heat exchanger (HX) 156 (see FIGS. 4-6) and a check valve 132b (see FIGS. 4-6), all coupled to the ACM 42 (see FIGS. 4-6). Further, the flow regulating element 86 (see FIGS. 4-6) comprising a parallel turbine valve 86a (see FIGS. 4-6) is coupled to the TC assembly 150 (see FIGS. 4-6).

In another embodiment, the installing step 252 comprises installing an ACM 42 (see FIG. 3) comprising a four wheel pack 70 (see FIG. 3) having one compressor 72 (see FIG. 3), a first turbine 74a (see FIG. 3), and a second turbine 74b (see FIG. 3) mechanically coupled in series on the ACM shaft 78a (see FIG. 3). In this embodiment, the installing step 252 further comprises installing the bypass air flow assembly 11 (see FIG. 3) comprising a parallel turbine valve assembly 118 (see FIG. 3) and coupling the parallel turbine valve assembly 118 (see FIG. 3) to the ACM 42 (see FIG. 3). The parallel turbine valve assembly 118 (see FIG. 3) comprises a compressor bypass valve 122 (see FIG. 3), an isolation valve 130 (see FIG. 3), a check valve 132a (see FIG. 2), and the bypass air flow regulating element 86 (see FIG. 3) comprising a parallel turbine valve 86a (see FIG. 3). The parallel turbine valve assembly 118 (see FIG. 3) transfers mechanical energy 170a (see FIG. 7) from the bypass air flow assembly 11 (see FIG. 3) to the ACM 42 (see FIG. 3). As further shown in FIG. 3, a high altitude valve (HAV) 138 may be installed.

As shown in FIG. 8, the method 250 further comprises step 254 of coupling the bypass air flow assembly 11 (see FIGS. 2-7) and the ACM 42 (see FIGS. 1-7) in a parallel operation path 84 (see FIGS. 2-7). As shown in FIG. 8, the method 250 further comprises step 256 of using the bypass air flow assembly 11 (see FIGS. 2-7) to extract energy from a bypass air flow 172 (see FIG. 7) flowing across the bypass air flow assembly 11 (see FIGS. 2-7) to obtain extracted energy 170 (see FIG. 7).

As shown in FIG. 8, the method 250 further comprises step 258 of transferring the extracted energy 170 (see FIG. 7) from the bypass air flow assembly 11 (see FIGS. 2-7) to the ACM 42 (see FIGS. 1-7) to aid the air cycle machine (ACM) pack system 10, 10a-10e (see FIGS. 1-7) in cooling performance at a low inlet pressure (see FIG. 7), such as a low air inlet pressure, resulting in an improved low inlet pressure cooling performance 168 (see FIG. 7) of the air cycle machine (ACM) pack system 10, 10a-10e (see FIGS. 1-7). The transferring step 258 comprises either transferring mechanical energy 170a (see FIG. 7) from the bypass air flow assembly 11 (see FIGS. 2, 3) to the ACM 42 (see FIGS. 2, 3), or transferring pneumatic energy 170b (see FIGS. 4-6) from the bypass air flow assembly 11 (see FIGS. 4-6) to the ACM 42 (see FIGS. 4-6).

Figure 9:
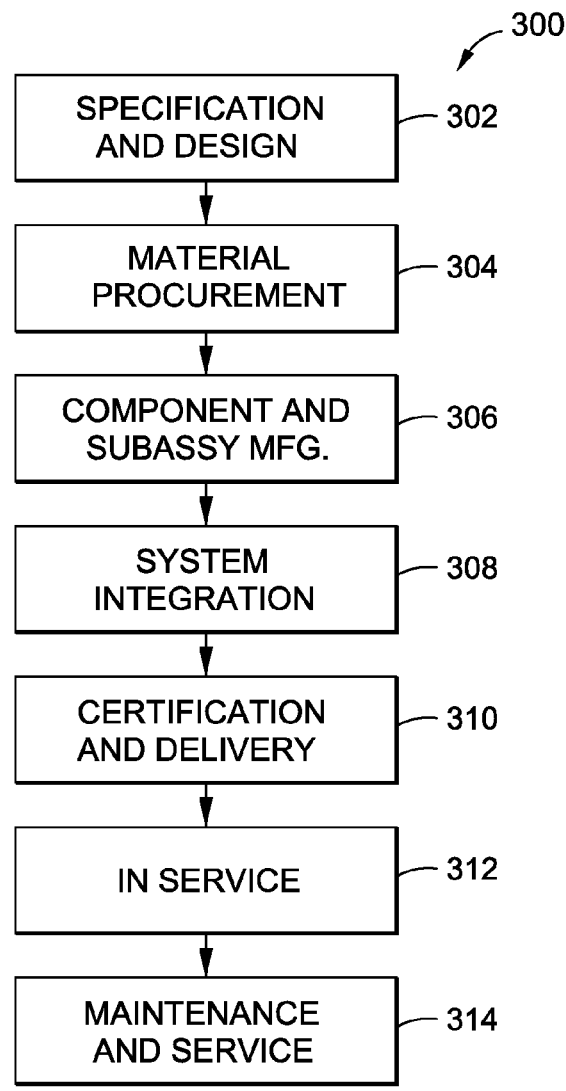
FIG. 9 is an illustration of a flow diagram of an aircraft production and service method; and, FIG. 10 is an illustration of a block diagram of an aircraft.
Figure 10:
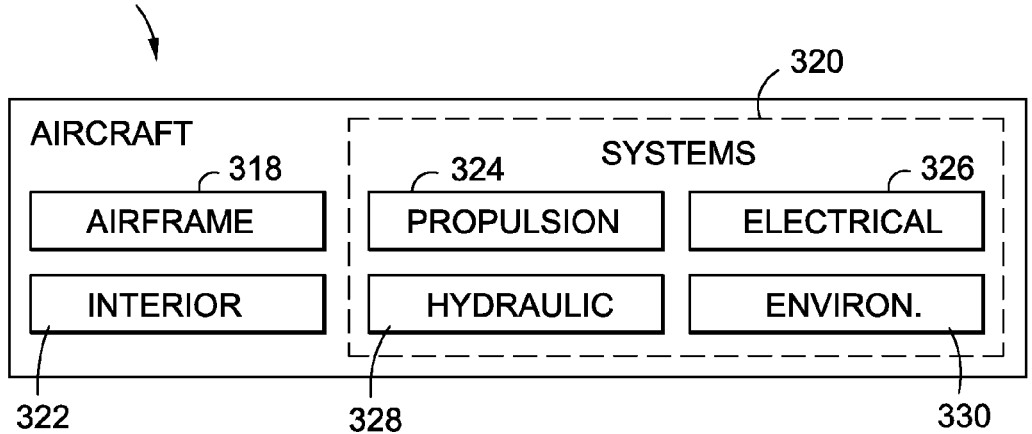

FIG. 9 is an illustration of a flow diagram of an aircraft production and service method 300. FIG. 10 is an illustration of a block diagram of an aircraft 316. Referring to FIGS. 9-10, embodiments of the disclosure may be described in the context of the aircraft production and service method 300, as shown in FIG. 9, and the aircraft 316, as shown in FIG. 10. During pre-production, exemplary aircraft production and service method 300 may include specification and design 302 of the aircraft 316 and material procurement 304. During production, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 which may also include modification, reconfiguration, refurbishment, and other suitable services.

Each of the processes of the aircraft production and service method 300 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 10, the aircraft 316 produced by exemplary aircraft production and service method 300 may include an airframe 318 with a plurality of high-level systems 320 and an interior 322. Examples of the plurality of high-level systems 320 may include one or more of a propulsion system 324, an electrical system 326, a hydraulic system 328, and an environmental system 330. Any number of other systems may also be included. Although an aerospace example is shown, the principles of the invention may be applied to other industries, such as the automotive industry.

Methods and systems embodied herein may be employed during any one or more of the stages of the production and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to routine maintenance and service 314.

Disclosed embodiments of the air cycle machine (ACM) pack system 10, 10a-10e (see FIGS. 2-7) and method 250 (see FIG. 8) provide a means to improve low inlet pressure cooling performance with the addition of a parallel turbine 75 (see FIG. 2) to a three wheel pack 70 (see FIG. 2), a turbo-compressor assembly 150 (see FIGS. 4-6) to a three wheel pack 70 (see FIGS. 4-6), or the addition of a parallel turbine valve assembly 118 (see FIG. 3) to a four wheel pack 120 (see FIG. 3) to route bypass air flow 172 (see FIG. 7), such as main turbine bypass flow, across the parallel turbine 75 (see FIG. 2) in lieu of pure bypass. Routing the bypass air flow 172 (see FIG. 7) across this parallel turbine 75 (see FIG. 2) both extracts additional power for driving the compressor 72 (see FIG. 2) and cools the exit air, both aiding pack cooling performance. Additionally, causing the bypass air flow 172 (see FIG. 2) to bypass the compressor 72 (see FIG. 2) as well allows the compressor 72 to operate more efficiently under low inlet pressure conditions, such as low air inlet pressure conditions, which also improves cooling performance of the ACM pack system 10.

In addition, disclosed embodiments of the air cycle machine (ACM) pack system 10, 10a-10e (see FIGS. 2-7) and method 250 (see FIG. 8) allow the compressor 72 (see FIG. 2) to operate at a more efficient design setting. When more air flow is provided by bleed air 50 (see FIG. 2), it is diverted to a parallel turbine 75 (see FIG. 2) and mechanical energy 170a (see FIG. 7) may be recovered to be used to operate the compressor 72 (see FIG. 2) or other components in the ACM pack system 10. By extracting power or energy from the turbine bypass air flow, the overall increase in pack outlet temperature may be partially mitigated due to the cooling effect from the power extraction. Moreover, if the turbine bypass air flow bypasses the compressor as well, the compressor may operate at a higher efficiency and greater pressure ratio for the same power input, further forestalling the performance fall off. For ACM pack systems 10 with one turbine 74 (see FIG. 2), an additional parallel turbine 75 (see FIG. 1) may be added to extract the power from the bypass air flow 172 (see FIG. 7), either on a common shaft or a mechanical drive element 80 (see FIG. 2) to transfer the power or extracted energy 170 (see FIG. 7) to the compressor 72 (see FIG. 2), either mechanically or pneumatically with a second compressor 72b (see FIGS. 4-6).

For packs with two turbines, one turbine 72a (see FIG. 3) is likely unused at higher altitudes due to the already lesser inlet pressures and lack of humidity in the outside air, in which case the use of a parallel turbine valve assembly 118 (see FIG. 3) may be used to power the otherwise unused first turbine 74a (see FIG. 3) with bypass air flow 172 (see FIG. 7). The use of a second turbine 74b (see FIG. 3) in parallel greatly improves low pressure cooling performance over that of simple turbine bypass air flow.

In addition, disclosed embodiments of the air cycle machine (ACM) pack system 10, 10a-10e (see FIGS. 2-7) and method 250 (see FIG. 8) provide for an ACM pack system 10 with improved low inlet pressure cooling performance that may better enable compliance with FAR (Federal Aviation Regulation) requirements regarding minimum air flow per occupant in a passenger cabin of an aircraft, without having to increase the size and weight of the ACM pack system 10.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An air cycle machine (ACM) pack system for an aircraft, the system having an improved low inlet pressure cooling performance, the system comprising:
   an air cycle machine (ACM) comprising at least one compressor mechanically coupled to at least one turbine in series on an ACM shaft;
   a primary heat exchanger and a secondary heat exchanger coupled to and in fluid communication with the at least one compressor of the ACM, the at least one compressor receiving outlet air from the primary heat exchanger, and the at least one compressor discharging compressor outlet air to the secondary heat exchanger; and,
   a bypass air flow assembly coupled in parallel to the ACM, the bypass air flow assembly having a bypass air flow regulating element, the bypass air flow assembly being coupled to the ACM via one of, a mechanical drive element, a parallel turbine valve assembly, or a turbo-compressor assembly,
   wherein the bypass air flow assembly transfers energy extracted by the bypass air flow assembly to the ACM to aid the air cycle machine (ACM) pack system in cooling performance, the extracted energy transferred via one of, the mechanical drive element, the parallel turbine valve assembly, or the turbo-compressor assembly.

2. The system of claim 1 wherein the bypass air flow assembly comprises a parallel turbine mechanically coupled to a turbine shaft and the mechanical drive element connecting the turbine shaft to the ACM shaft to drive the at least one turbine and the parallel turbine in parallel.

3. The system of claim 2 wherein the mechanical drive element has a first end connected to the turbine shaft and a second end connected to the ACM shaft to drive the at least one turbine and the parallel turbine in parallel and to transfer mechanical energy from the bypass air flow assembly to the ACM.

4. The system of claim 3 wherein the mechanical drive element comprises a mechanical shaft or a geared shaft.

5. The system of claim 3 wherein the bypass air flow regulating element comprises a parallel turbine valve coupled to the parallel turbine.

6. The system of claim 1 wherein the bypass air flow assembly comprises the turbo-compressor assembly coupled to a regeneration heat exchanger and a check valve, all coupled to the ACM, and the flow regulating element comprises a parallel turbine valve coupled to the turbo-compressor assembly.

7. The system of claim 1 wherein the at least one turbine comprises a first turbine and a second turbine mechanically coupled in series on the ACM shaft.

8. The system of claim 7 wherein the bypass air flow regulating element comprises a parallel turbine valve coupled between the first turbine and the second turbine.

9. The system of claim 8 wherein the bypass air flow assembly comprises the parallel turbine valve assembly coupled to the ACM, the parallel turbine valve assembly comprising a compressor bypass valve, an isolation valve, a check valve, and the parallel turbine valve.

10. The system of claim 1 wherein the bypass air flow assembly is either a mechanical energy transfer bypass air flow assembly or a pneumatic energy transfer bypass air flow assembly.

11. An aircraft comprising:
   one or more aircraft engines each having a bleed air system for generating bleed air;
   a fuselage defining an interior volume having an aircraft cabin and a pack bay separate from the aircraft cabin; and,
   an aircraft air conditioning system positioned in the pack bay and in fluid communication with the aircraft cabin, the aircraft air conditioning system having an air cycle machine (ACM) pack system comprising:
      an air cycle machine (ACM) comprising at least one compressor mechanically coupled to at least one turbine in series on an ACM shaft;
      a primary heat exchanger and a secondary heat exchanger coupled to and in fluid communication with the at least one compressor of the ACM, the at least one compressor receiving outlet air from the primary heat exchanger, and the at least one compressor discharging compressor outlet air to the secondary heat exchanger; and,
      a bypass air flow assembly coupled in parallel to the ACM, the bypass air flow assembly having a parallel turbine valve, the bypass air flow assembly being coupled to the ACM via one of, a mechanical drive element, a parallel turbine valve assembly, or a turbo-compressor assembly,
      wherein the bypass air flow assembly transfers energy extracted by the bypass air flow assembly to the ACM to aid the ACM pack system in cooling performance, the extracted energy transferred via one of, the mechanical drive element, the parallel turbine valve assembly, or the turbo-compressor assembly.

12. The aircraft of claim 11 wherein the mechanical drive element comprises a mechanical shaft or a geared shaft.

13. The aircraft of claim 12 wherein the bypass air flow assembly comprises a parallel turbine coupled to a turbine shaft and the mechanical drive element connecting the turbine shaft to the ACM shaft to drive the at least one turbine and the parallel turbine in parallel and to transfer mechanical energy from the bypass air flow assembly to the ACM.

14. The aircraft of claim 11 wherein the bypass air flow assembly comprises the turbo-compressor assembly coupled to a regeneration heat exchanger and a check valve, all coupled to the ACM, and the parallel turbine valve is coupled to the turbo-compressor assembly, the turbo-compressor assembly transferring pneumatic energy from the bypass air flow assembly to the ACM.

15. The aircraft of claim 11 wherein the at least one turbine comprises a first turbine and a second turbine mechanically coupled in series on the ACM shaft, and wherein the parallel turbine valve is coupled between the first turbine and the second turbine.

16. The aircraft of claim 15 wherein the bypass air flow assembly comprises the parallel turbine valve assembly coupled to the ACM, the parallel turbine valve assembly comprising a compressor bypass valve, an isolation valve, a check valve, and the parallel turbine valve, the parallel turbine valve assembly transferring mechanical energy from the bypass air flow assembly to the ACM.

17. A method for improving low inlet pressure cooling performance of an air cycle machine (ACM) pack system, the method comprising the steps of:
- installing an air cycle machine (ACM) pack system in an aircraft air conditioning system of an aircraft, the ACM pack system comprising:
  - an air cycle machine (ACM) comprising at least one compressor mechanically coupled to at least one turbine in series on an ACM shaft;
  - a primary heat exchanger and a secondary heat exchanger coupled to and in fluid communication with the at least one compressor of the ACM, the at least one compressor receiving outlet air from the primary heat exchanger, and the at least one compressor discharging compressor outlet air to the secondary heat exchanger; and,
  - a bypass air flow assembly configured for coupling to the ACM and having a bypass air flow regulating element,
- coupling the bypass air flow assembly and the ACM in parallel, the bypass air flow assembly being coupled to the ACM via one of, a mechanical drive element, a parallel turbine valve assembly, or a turbo-compressor assembly;
- using the bypass air flow assembly to divert an amount of bleed air from a bleed air system of an aircraft engine of the aircraft to the bypass air flow assembly, the bleed air comprising a bypass air flow flowing across the bypass air flow assembly, and the bypass air flow assembly extracting energy from the bypass air flow to obtain extracted energy; and,
- transferring the extracted energy from the bypass air flow assembly to the ACM to aid the air cycle machine (ACM) pack system in cooling performance, the extracted energy transferred via one of, the mechanical drive element, the parallel turbine valve assembly, or the turbo-compressor assembly.

18. The method of claim 17 wherein the transferring step comprises either transferring mechanical energy from the bypass air flow assembly to the ACM, or transferring pneumatic energy from the bypass air flow assembly to the ACM.

19. The method of claim 17 wherein the coupling the bypass air flow assembly and the ACM step further comprises coupling the bypass air flow assembly comprising the mechanical drive element, the mechanical drive element comprising a mechanical shaft or a geared shaft.

20. The method of claim 19 wherein the installing step further comprises installing the bypass air flow assembly comprising a parallel turbine coupled to a turbine shaft and the mechanical drive element connecting the turbine shaft to the ACM shaft to drive the at least one turbine and the parallel turbine in parallel and to transfer mechanical energy from the bypass air flow assembly to the ACM.

21. The method of claim 17 wherein the installing step further comprises installing the bypass air flow assembly comprising the turbo-compressor assembly coupled to a regeneration heat exchanger and a check valve, all coupled to the ACM, and coupling the flow regulating element comprising a parallel turbine valve to the turbo-compressor assembly.

22. The method of claim 17 wherein the installing step further comprises installing the at least one turbine comprising a first turbine and a second turbine mechanically coupled in series on the ACM shaft, and wherein a parallel turbine valve is coupled between the first turbine and the second turbine.

23. The method of claim 22 wherein the installing step further comprises installing the bypass air flow assembly comprising the parallel turbine valve assembly coupled to the ACM, the parallel turbine valve assembly comprising a compressor bypass valve, an isolation valve, a check valve, and the bypass air flow regulating element comprising a parallel turbine valve, the parallel turbine valve assembly transferring mechanical energy from the bypass air flow assembly to the ACM.

* * * * *